United States Patent
Dalimonte et al.

(10) Patent No.: US 9,534,525 B2
(45) Date of Patent: Jan. 3, 2017

(54) MIXER ASSEMBLY FOR EXHAUST AFTERTREATMENT SYSTEM

(71) Applicant: Tenneco Automotive Operating Company Inc., Lake Forest, IL (US)

(72) Inventors: Lawrence Dalimonte, Bath, MI (US); Peter J. Mattei, Canton, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 35 days.

(21) Appl. No.: 14/722,762

(22) Filed: May 27, 2015

(65) Prior Publication Data

US 2016/0348557 A1    Dec. 1, 2016

(51) Int. Cl.

| F01N 1/12 | (2006.01) |
|---|---|
| F01N 3/20 | (2006.01) |
| F01N 3/28 | (2006.01) |
| F01N 3/021 | (2006.01) |
| F01N 3/10 | (2006.01) |

(Continued)

(52) U.S. Cl.
CPC ........... *F01N 3/2066* (2013.01); *F01N 3/2882* (2013.01); *F01N 3/2892* (2013.01); *B01F 5/0613* (2013.01); *B01F 5/0614* (2013.01); *B01F 2005/0627* (2013.01); *B01F 2005/0629* (2013.01); *B01F 2005/0639* (2013.01); *F01N 1/086* (2013.01); *F01N 1/12* (2013.01); *F01N 3/021* (2013.01); *F01N 3/103* (2013.01); *F01N 3/106* (2013.01); *F01N 13/009* (2014.06); *F01N 2240/20* (2013.01); *F01N 2610/02* (2013.01); *F01N 2610/1453* (2013.01)

(58) Field of Classification Search
CPC ................. B01F 5/0613; B01F 5/0614; B01F 2005/0627;B01F 2005/0629; B01F 2005/0639; F01N 1/086; F01N 1/12; F01N 3/103; F01N 3/106; F01N 3/2066; F01N 3/2892; F01N 13/009; F01N 2240/20; F01N 2610/02; F01N 2610/1453; F01N 3/021
USPC .......... 60/286, 295, 297, 299, 301, 310, 311, 60/317, 324
See application file for complete search history.

(56) References Cited

U.S. PATENT DOCUMENTS

| 1,818,469 A | 8/1931 | Floyd, Jr. |
|---|---|---|
| 1,848,990 A | 3/1932 | Boyd et al. |

(Continued)

FOREIGN PATENT DOCUMENTS

| DE | 3940747 C1 | 7/1990 |
|---|---|---|
| DE | 4025017 A1 | 2/1992 |

(Continued)

*Primary Examiner* — Jorge Leon, Jr.
(74) *Attorney, Agent, or Firm* — Harness, Dickey & Pierce, P.L.C.

(57) ABSTRACT

An exhaust aftertreatment system may include an injector, an aftertreatment device and a mixer assembly. The injector may be configured to inject a fluid into an exhaust passageway that receives exhaust gas from a combustion engine. The aftertreatment device may be disposed in the exhaust passageway downstream of the injector. The mixer assembly may be disposed in the exhaust passageway upstream of the aftertreatment device and may include a first stage having a plurality of parallel plates and a second stage connected to the first stage and disposed downstream of the first stage. The second stage may include an auger blade. The mixer assembly may divide an exhaust stream into at least two flow paths.

48 Claims, 17 Drawing Sheets

(51) Int. Cl.
  *B01F 5/06* (2006.01)
  *F01N 13/00* (2010.01)
  *F01N 1/08* (2006.01)

(56) References Cited

U.S. PATENT DOCUMENTS

| | | |
|---|---|---|
| 1,974,110 A | 9/1934 | Higley |
| 2,127,977 A | 8/1938 | Lamb |
| 2,511,597 A | 6/1950 | Marx |
| 2,561,457 A | 7/1951 | Beales et al. |
| 2,621,477 A | 12/1952 | Powter |
| 2,628,475 A | 2/1953 | Heath |
| 2,660,256 A | 11/1953 | Walker |
| 2,663,378 A | 12/1953 | Keller |
| 2,797,745 A | 7/1957 | Rowell |
| 2,841,235 A | 7/1958 | Curioni |
| 3,136,353 A | 6/1964 | Lloyd |
| 3,174,526 A | 3/1965 | Von Linde |
| 3,544,290 A | 12/1970 | Larson et al. |
| 3,545,179 A | 12/1970 | Nelson et al. |
| 3,549,333 A | 12/1970 | Tabak |
| 3,643,623 A | 2/1972 | Eng et al. |
| 3,756,575 A | 9/1973 | Cottell |
| 3,797,240 A | 3/1974 | Inoue et al. |
| 3,880,597 A | 4/1975 | Goldschmidt et al. |
| 3,927,731 A | 12/1975 | Lancaster |
| 3,957,471 A | 5/1976 | Tamachi et al. |
| 4,011,922 A | 3/1977 | Goplen |
| 4,043,539 A | 8/1977 | Gilmer et al. |
| 4,209,493 A | 6/1980 | Olson |
| 4,255,122 A | 3/1981 | Alpkvist et al. |
| 4,300,924 A | 11/1981 | Coyle |
| 4,339,918 A | 7/1982 | Michikawa |
| 4,364,724 A | 12/1982 | Alpkvist |
| 4,364,725 A | 12/1982 | Buschulte |
| 4,408,983 A | 10/1983 | Masters et al. |
| 4,465,046 A | 8/1984 | May |
| 4,538,413 A | 9/1985 | Shinzawa et al. |
| 4,541,239 A | 9/1985 | Tokura et al. |
| 4,571,938 A | 2/1986 | Sakurai |
| 4,576,617 A | 3/1986 | Renevot |
| 4,579,195 A | 4/1986 | Nieri et al. |
| 4,588,372 A | 5/1986 | Torborg |
| 4,604,868 A | 8/1986 | Nomoto et al. |
| 4,657,504 A | 4/1987 | Akiyama et al. |
| 4,683,978 A | 8/1987 | Venter |
| 4,684,341 A | 8/1987 | Kawamura et al. |
| 4,692,030 A | 9/1987 | Tauscher et al. |
| 4,725,223 A | 2/1988 | Coppin et al. |
| 4,825,658 A | 5/1989 | Beebe |
| 4,840,028 A | 6/1989 | Kusuda et al. |
| 4,909,635 A | 3/1990 | Lecoffre et al. |
| 4,912,920 A | 4/1990 | Hirabayashi |
| 4,929,088 A | 5/1990 | Smith |
| 4,951,464 A | 8/1990 | Eickhoff et al. |
| 4,985,058 A | 1/1991 | Prinsloo et al. |
| 4,987,738 A | 1/1991 | Lopez-Crevillen et al. |
| 4,989,408 A | 2/1991 | Leonhard et al. |
| 5,090,896 A | 2/1992 | Kenner et al. |
| 5,094,075 A | 3/1992 | Berendes |
| 5,105,621 A | 4/1992 | Simmons et al. |
| 5,109,950 A | 5/1992 | Lescher |
| 5,140,814 A | 8/1992 | Kreutmair et al. |
| 5,185,998 A | 2/1993 | Brew |
| 5,272,871 A | 12/1993 | Oshima et al. |
| 5,320,523 A | 6/1994 | Stark |
| 5,339,630 A | 8/1994 | Pettit |
| 5,417,059 A | 5/1995 | Hartel et al. |
| 5,426,269 A | 6/1995 | Wagner et al. |
| 5,437,123 A | 8/1995 | Greiner et al. |
| 5,489,153 A | 2/1996 | Berner et al. |
| 5,546,701 A | 8/1996 | Greiner et al. |
| 5,571,484 A | 11/1996 | Pettit et al. |
| 5,590,526 A | 1/1997 | Cho |
| 5,617,721 A | 4/1997 | Slawson |
| 5,826,428 A | 10/1998 | Blaschke |
| 5,829,248 A | 11/1998 | Clifton |
| 5,831,223 A | 11/1998 | Kesselring |
| 5,832,720 A | 11/1998 | Svahn |
| 5,916,134 A | 6/1999 | Yang et al. |
| 5,944,510 A | 8/1999 | Greiner et al. |
| 6,086,241 A | 7/2000 | Herr et al. |
| RE36,969 E | 11/2000 | Streiff et al. |
| 6,158,214 A | 12/2000 | Kempka et al. |
| 6,258,144 B1 | 7/2001 | Huang |
| 6,312,650 B1 | 11/2001 | Frederiksen et al. |
| 6,314,722 B1 | 11/2001 | Matros et al. |
| 6,442,933 B2 | 9/2002 | Rusch |
| 6,449,947 B1 | 9/2002 | Liu et al. |
| 6,536,420 B1 | 3/2003 | Cheng |
| 6,540,151 B1 | 4/2003 | Steiner et al. |
| 6,679,351 B2 | 1/2004 | Cummings et al. |
| 6,712,869 B2 | 3/2004 | Cheng et al. |
| 6,722,123 B2 | 4/2004 | Liu et al. |
| 6,722,124 B2 | 4/2004 | Pawson et al. |
| 6,740,198 B2 | 5/2004 | Ahola et al. |
| 6,767,378 B2 | 7/2004 | Nishiyama et al. |
| 6,772,123 B2 | 8/2004 | Cooklev et al. |
| 6,796,403 B1 | 9/2004 | Laughlin |
| 6,840,212 B2 | 1/2005 | Kim |
| 6,916,172 B2 | 7/2005 | Steiner |
| 6,932,049 B2 | 8/2005 | Kim |
| 7,028,663 B1 | 4/2006 | Kim |
| 7,073,626 B2 | 7/2006 | Weinhold et al. |
| 7,104,251 B2 | 9/2006 | Kim |
| 7,117,973 B2 | 10/2006 | Graefenstein |
| 7,267,098 B1 | 9/2007 | Tasanont |
| 7,328,572 B2 | 2/2008 | McKinley et al. |
| 7,383,919 B2 | 6/2008 | Arlasky |
| 7,490,467 B2 | 2/2009 | Cummings |
| 7,510,172 B2 | 3/2009 | Kojima |
| 7,562,521 B2 | 7/2009 | Shirai et al. |
| 7,581,387 B2 | 9/2009 | Bui et al. |
| 7,661,509 B2 | 2/2010 | Dadd |
| 7,712,305 B2 | 5/2010 | Kapsos et al. |
| 7,748,212 B2 | 7/2010 | Sedlacek et al. |
| 7,748,976 B2 | 7/2010 | Burrahm et al. |
| 7,762,060 B2 | 7/2010 | Easley, Jr. et al. |
| 7,814,745 B2 | 10/2010 | Levin et al. |
| 7,849,676 B2 | 12/2010 | Witte-Merl |
| 7,856,807 B2 | 12/2010 | Gibson |
| 7,896,645 B2 | 3/2011 | Loving |
| 7,908,847 B2 | 3/2011 | Crawley et al. |
| 7,971,433 B2 | 7/2011 | Kabat et al. |
| 7,971,579 B2 | 7/2011 | Heald et al. |
| 7,975,472 B2 | 7/2011 | Halbei et al. |
| 7,980,069 B2 | 7/2011 | Arellano et al. |
| 8,033,101 B2 | 10/2011 | Amon et al. |
| 8,033,104 B2 | 10/2011 | Zhang |
| 8,061,890 B2 | 11/2011 | Suhner |
| 8,082,732 B2 | 12/2011 | Nefischer |
| 8,096,701 B2 | 1/2012 | Beckmann et al. |
| 8,141,353 B2 | 3/2012 | Zheng et al. |
| 8,146,343 B2 | 4/2012 | Patterson et al. |
| 8,173,088 B2 | 5/2012 | Makartchouk et al. |
| 8,181,446 B2 | 5/2012 | Honda et al. |
| 8,196,394 B2 | 6/2012 | Fujita et al. |
| 8,209,971 B2 | 7/2012 | Kalantarifiroozabad et al. |
| 8,215,450 B2 | 7/2012 | Chien |
| 8,240,135 B2 | 8/2012 | Zhang |
| 8,240,137 B2 | 8/2012 | Liu et al. |
| 8,245,504 B2 | 8/2012 | Kowada |
| 8,272,777 B2 | 9/2012 | Kohrs et al. |
| 8,276,372 B2 | 10/2012 | Kowada |
| 8,297,050 B2 | 10/2012 | Ranganathan et al. |
| 8,312,962 B2 | 11/2012 | Melcher et al. |
| 8,347,610 B2 | 1/2013 | Kowada |
| 8,359,838 B2 | 1/2013 | Yamazaki et al. |
| 8,371,114 B2 | 2/2013 | Hayashi et al. |
| 8,375,709 B2 | 2/2013 | Salanta et al. |
| 8,397,492 B2 | 3/2013 | Kowada |
| 8,397,495 B2 | 3/2013 | Salanta et al. |
| 8,402,752 B2 | 3/2013 | Kowada |
| 8,484,948 B2 | 7/2013 | Kozal |

(56) References Cited

U.S. PATENT DOCUMENTS

| | | | |
|---|---|---|---|
| 8,499,548 B2 | 8/2013 | De Rudder et al. | |
| 8,539,761 B2 | 9/2013 | Lebas et al. | |
| 8,602,159 B2 | 12/2013 | Harris et al. | |
| 8,627,921 B2 | 1/2014 | Mead | |
| 8,661,792 B2 | 3/2014 | Greber et al. | |
| 8,695,330 B2 | 4/2014 | Davidson et al. | |
| 8,745,978 B2 | 6/2014 | Vanvolsem et al. | |
| 8,745,979 B2 | 6/2014 | Sedlacek et al. | |
| 8,747,761 B2 | 6/2014 | Kageyama et al. | |
| 8,800,276 B2 | 8/2014 | Levin et al. | |
| 8,813,481 B2 | 8/2014 | Kowada | |
| 8,821,154 B2 | 9/2014 | Yamashita et al. | |
| 8,915,064 B2 | 12/2014 | Blaisdell et al. | |
| 8,938,954 B2 | 1/2015 | De Rudder et al. | |
| 2002/0073698 A1 | 6/2002 | D'Herde et al. | |
| 2003/0079467 A1 | 5/2003 | Liu et al. | |
| 2005/0048430 A1 | 3/2005 | Steiner | |
| 2006/0016176 A1 | 1/2006 | Hilden et al. | |
| 2006/0101811 A1 | 5/2006 | Linna et al. | |
| 2006/0115402 A1 | 6/2006 | Sun et al. | |
| 2006/0162690 A1 | 7/2006 | Kim | |
| 2006/0218902 A1 | 10/2006 | Arellano et al. | |
| 2006/0283181 A1 | 12/2006 | Crawley et al. | |
| 2007/0169469 A1 | 7/2007 | Knitt | |
| 2007/0169764 A1 | 7/2007 | Lo | |
| 2007/0204751 A1 | 9/2007 | Wirth et al. | |
| 2007/0245718 A1 | 10/2007 | Cheng et al. | |
| 2007/0274877 A1 | 11/2007 | Bush et al. | |
| 2008/0066448 A1 | 3/2008 | Halbei et al. | |
| 2008/0092532 A1 | 4/2008 | Bareis et al. | |
| 2008/0184700 A1 | 8/2008 | Harrer | |
| 2008/0250776 A1 | 10/2008 | Brown et al. | |
| 2008/0295497 A1 | 12/2008 | Kornherr et al. | |
| 2008/0307780 A1 | 12/2008 | Iverson et al. | |
| 2008/0308955 A1 | 12/2008 | Beckmann et al. | |
| 2009/0000287 A1 | 1/2009 | Blaisdell et al. | |
| 2009/0004982 A1 | 1/2009 | Kim et al. | |
| 2009/0019843 A1 | 1/2009 | Levin et al. | |
| 2009/0045007 A1 | 2/2009 | Counts | |
| 2009/0178395 A1 | 7/2009 | Huffmeyer | |
| 2009/0180937 A1 | 7/2009 | Nohl et al. | |
| 2009/0255242 A1 | 10/2009 | Paterson et al. | |
| 2009/0313979 A1 | 12/2009 | Kowada | |
| 2009/0320453 A1 | 12/2009 | Salanta et al. | |
| 2010/0000205 A1 | 1/2010 | Freese | |
| 2010/0037593 A1* | 2/2010 | Kozal | F01N 3/2892 60/282 |
| 2010/0083925 A1 | 4/2010 | Winter et al. | |
| 2010/0132344 A1 | 6/2010 | Peters | |
| 2010/0139258 A1 | 6/2010 | Hackett et al. | |
| 2010/0218490 A1 | 9/2010 | Forster et al. | |
| 2010/0223916 A1 | 9/2010 | Hayashi et al. | |
| 2010/0263359 A1 | 10/2010 | Haverkamp et al. | |
| 2010/0293931 A1 | 11/2010 | Peters et al. | |
| 2010/0319329 A1 | 12/2010 | Khadiya | |
| 2011/0023457 A1 | 2/2011 | Miebach et al. | |
| 2011/0036082 A1 | 2/2011 | Collinot | |
| 2011/0041478 A1 | 2/2011 | Lee et al. | |
| 2011/0067381 A1* | 3/2011 | Zimmerman | F01N 3/2066 60/273 |
| 2011/0083428 A1 | 4/2011 | Makartchouk | |
| 2011/0094206 A1 | 4/2011 | Liu et al. | |
| 2011/0099978 A1 | 5/2011 | Davidson et al. | |
| 2011/0146254 A1 | 6/2011 | Yi et al. | |
| 2011/0146264 A1 | 6/2011 | Roychoudhury et al. | |
| 2011/0197570 A1 | 8/2011 | Kalantarifiroozabad et al. | |
| 2011/0205837 A1 | 8/2011 | Gentgen | |
| 2011/0258983 A1 | 10/2011 | Vosz | |
| 2011/0283686 A1 | 11/2011 | Jebasinski | |
| 2011/0289906 A1 | 12/2011 | Morley et al. | |
| 2011/0308234 A1 | 12/2011 | De Rudder et al. | |
| 2012/0011837 A1 | 1/2012 | Navathe et al. | |
| 2012/0036847 A1 | 2/2012 | Schreiber et al. | |
| 2012/0124982 A1 | 5/2012 | Bell et al. | |
| 2012/0151902 A1 | 6/2012 | Yi et al. | |
| 2012/0167569 A1 | 7/2012 | Takiguchi et al. | |
| 2012/0192547 A1 | 8/2012 | Mastbergen et al. | |
| 2012/0204541 A1 | 8/2012 | Li et al. | |
| 2012/0227390 A1 | 9/2012 | Wikaryasz et al. | |
| 2012/0255278 A1 | 10/2012 | Miao et al. | |
| 2012/0260635 A1 | 10/2012 | Aneja et al. | |
| 2012/0320708 A1 | 12/2012 | Geibel | |
| 2013/0098002 A1 | 4/2013 | Danckert et al. | |
| 2013/0098008 A1 | 4/2013 | Mori | |
| 2013/0164181 A1 | 6/2013 | Iijima et al. | |
| 2013/0170973 A1 | 7/2013 | Staskowiak et al. | |
| 2013/0216442 A1 | 8/2013 | Brunel et al. | |
| 2013/0239546 A1* | 9/2013 | Levin | B01F 5/0268 60/274 |
| 2013/0333363 A1 | 12/2013 | Joshi et al. | |
| 2014/0033686 A1 | 2/2014 | Fischer et al. | |
| 2014/0044603 A1 | 2/2014 | Greber | |
| 2014/0077400 A1 | 3/2014 | Sampath et al. | |
| 2014/0230411 A1 | 8/2014 | De Rudder et al. | |
| 2014/0238000 A1 | 8/2014 | Olivier | |
| 2014/0238002 A1 | 8/2014 | Olivier et al. | |
| 2014/0245718 A1 | 9/2014 | Olivier | |
| 2014/0318112 A1 | 10/2014 | Solbrig et al. | |
| 2014/0325967 A1 | 11/2014 | Kimura | |
| 2014/0332312 A1 | 11/2014 | Harris et al. | |
| 2014/0345257 A1 | 11/2014 | Levin et al. | |
| 2015/0040537 A1 | 2/2015 | Hicks et al. | |
| 2015/0040547 A1 | 2/2015 | Brockman et al. | |
| 2015/0044103 A1 | 2/2015 | Sampath et al. | |
| 2015/0110681 A1 | 4/2015 | Ferront et al. | |

FOREIGN PATENT DOCUMENTS

| | | |
|---|---|---|
| DE | 4121940 A1 | 1/1993 |
| DE | 4203807 A1 | 8/1993 |
| DE | 4307525 A1 | 9/1994 |
| DE | 4417238 A1 | 9/1994 |
| DE | 4313393 A1 | 10/1994 |
| DE | 4440716 A1 | 7/1996 |
| DE | 102004000066 A1 | 6/2006 |
| DE | 202006017848 U1 | 3/2007 |
| DE | 102005052064 A1 | 5/2007 |
| DE | 102005059971 A1 | 6/2007 |
| DE | 102006024778 B3 | 7/2007 |
| DE | 102006043225 A1 | 3/2008 |
| DE | 102007012790 A1 | 9/2008 |
| DE | 102008009564 A1 | 8/2009 |
| DE | 102008029110 A1 | 12/2009 |
| DE | 102009036511 A1 | 2/2011 |
| DE | 102011077156 A1 | 12/2012 |
| DE | 202013006962 | 8/2013 |
| DE | 102012008556 A1 | 10/2013 |
| DE | 102012010878 A1 | 12/2013 |
| DE | 102013211662 A1 | 12/2014 |
| DE | 102013012909 A1 | 2/2015 |
| EP | 0470361 A1 | 2/1992 |
| EP | 0555746 A1 | 8/1993 |
| EP | 1109993 B1 | 6/2001 |
| EP | 1262644 A2 | 12/2002 |
| EP | 1712751 A2 | 10/2006 |
| EP | 2111916 A1 | 10/2009 |
| EP | 2130605 A2 | 12/2009 |
| EP | 2168672 A1 | 3/2010 |
| EP | 2465602 A2 | 6/2012 |
| EP | 2607641 A1 | 6/2013 |
| GB | 550188 A | 12/1942 |
| GB | 2321084 A | 7/1998 |
| GB | 2381218 A | 4/2003 |
| JP | S59-174310 U | 11/1984 |
| JP | H01-130009 A | 5/1989 |
| JP | H02223624 A | 9/1990 |
| JP | H05-332130 A | 12/1993 |
| JP | H10165769 A | 6/1998 |
| JP | H10-259712 A | 9/1998 |
| JP | H10231721 A | 9/1998 |
| JP | H11-117729 A | 4/1999 |
| JP | H11166410 A | 6/1999 |
| JP | 2000145434 A | 5/2000 |
| JP | 2003074335 A | 3/2003 |

(56) References Cited

FOREIGN PATENT DOCUMENTS

| | | | |
|---|---|---|---|
| JP | 2003193823 A | 7/2003 |
| JP | 2006183509 A | 7/2006 |
| JP | 2006205077 A | 8/2006 |
| JP | 2006329019 A | 12/2006 |
| JP | 2007239486 A | 9/2007 |
| JP | 2008-274852 A | 11/2008 |
| JP | 2008309000 A | 12/2008 |
| JP | 2009103019 A | 5/2009 |
| JP | 2009114910 A | 5/2009 |
| JP | 2009144614 A | 7/2009 |
| JP | 2009150338 A | 7/2009 |
| JP | 2009228484 A | 10/2009 |
| JP | 2009275569 A | 11/2009 |
| JP | 2011064069 A | 3/2011 |
| JP | 2011519400 A | 7/2011 |
| JP | 2011206751 A | 10/2011 |
| JP | 5090890 B2 | 12/2012 |
| JP | H05288047 A | 2/2013 |
| WO | WO-9612877 A1 | 5/1996 |
| WO | WO-97/35107 A1 | 9/1997 |
| WO | WO-9830797 A1 | 7/1998 |
| WO | WO-03036054 A1 | 5/2003 |
| WO | WO-03036056 A1 | 5/2003 |
| WO | WO-2008/034981 A1 | 3/2008 |
| WO | WO-2008030259 A1 | 3/2008 |
| WO | WO-2008112343 A2 | 9/2008 |
| WO | WO-2009024815 A2 | 2/2009 |
| WO | WO-2012044233 A1 | 4/2012 |
| WO | WO-2013048309 A1 | 4/2013 |
| WO | WO-2013087852 A2 | 6/2013 |
| WO | WO-2013099404 A1 | 7/2013 |
| WO | WO-2013105336 A1 | 7/2013 |
| WO | WO-2014051605 A1 | 4/2014 |
| WO | WO-2014109192 A1 | 7/2014 |

\* cited by examiner

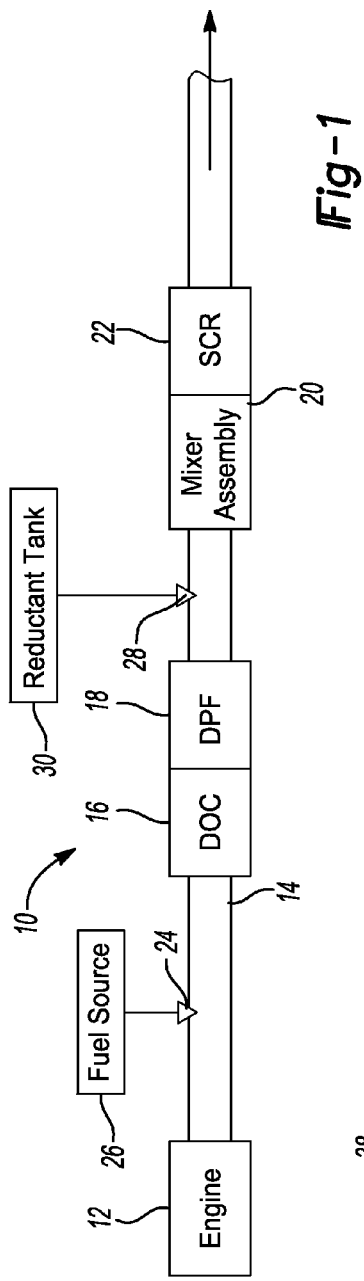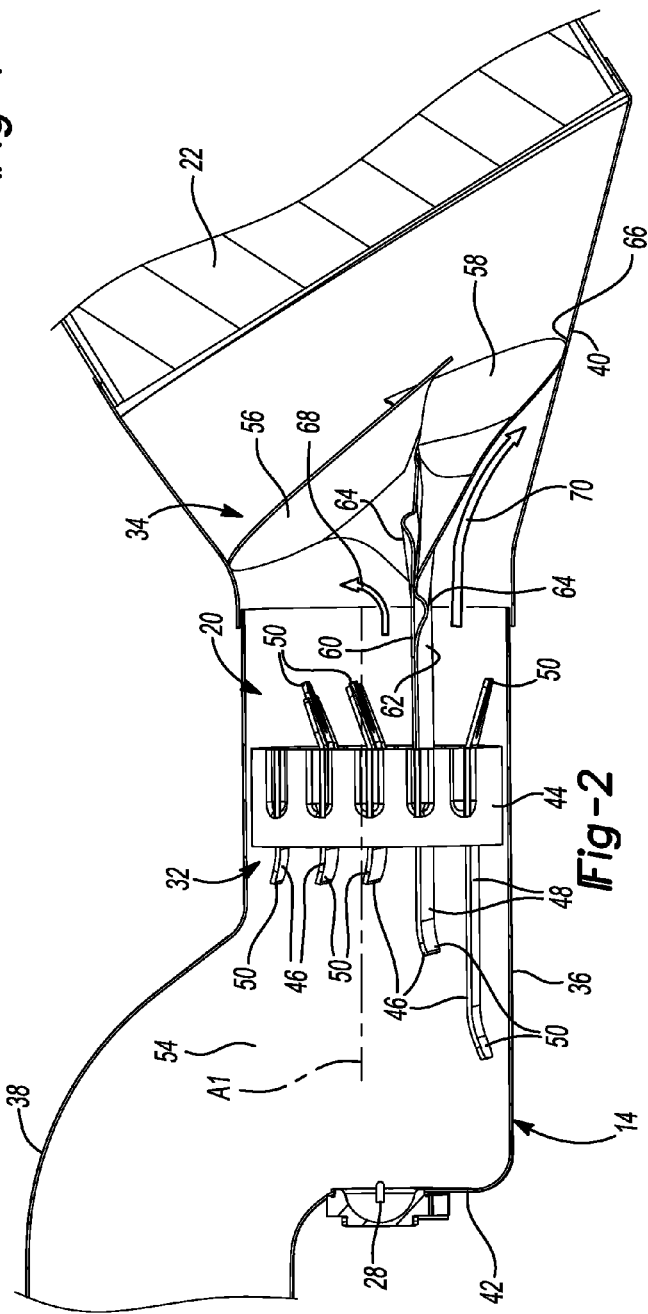

— 1 —

MIXER ASSEMBLY FOR EXHAUST AFTERTREATMENT SYSTEM

FIELD

The present disclosure relates to a mixer assembly for an exhaust aftertreatment system.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include a hydrocarbon (HC) injector, a diesel oxidation catalyst (DOC), a diesel particulate filter (DPF), and a selective catalytic reduction (SCR) system.

SCR technology has been used in conjunction with reducing nitrogen oxides present in the exhaust of combustion engines. Some of these systems are constructed using urea-based technology including a container for storing a reductant (e.g., urea) and a delivery system (including an injector, for example) for transmitting the reductant from the container to the exhaust stream. A mixer is typically provided for mixing the injected reductant with the exhaust gas before the reductant reaches a catalyst with which the reductant reacts. While these systems may have performed well in the past, it may be desirable to provide an improved mixer to more efficiently and effectively mix the reductant with the exhaust stream.

SUMMARY

This section provides a general summary of the disclosure, and is not a comprehensive disclosure of its full scope or all of its features.

In one form, the present disclosure provides an exhaust aftertreatment system that may include an injector, an aftertreatment device (e.g., a catalyst or filter), and a mixer assembly. The injector may be configured to inject a fluid into an exhaust passageway that receives exhaust gas from a combustion engine. The aftertreatment device may be disposed in the exhaust passageway downstream of the injector. The mixer assembly may be disposed in the exhaust passageway upstream of the aftertreatment device and may include a first stage having a plurality of parallel plates and a second stage connected to the first stage and disposed downstream of the first stage. The second stage may include an auger blade. The mixer assembly may divide an exhaust stream into at least two flow paths.

In another form, the present disclosure provides an exhaust aftertreatment system that may include an exhaust passageway, an injector, an aftertreatment device and a mixer assembly. The exhaust passageway may receive exhaust gas from a combustion engine and may include a curved portion, a cylindrical portion downstream of the curved portion, and a conical portion downstream of the cylindrical portion. The cylindrical portion may be directly adjacent the curved portion and the conical portion. The injector may be configured to inject a fluid into the exhaust passageway. The aftertreatment device may be disposed in the exhaust passageway downstream of the injector. The mixer assembly may be disposed in the exhaust passageway upstream of the aftertreatment device and downstream of the injector. The mixer assembly may include a plurality of parallel plates disposed in the cylindrical portion and an auger blade disposed downstream of the parallel plates and fixedly connected to one of the parallel plates. The mixer assembly may divide an exhaust stream into at least two flow paths.

In some configurations, the auger blade is disposed in the conical portion of the exhaust passageway.

In some configurations, the auger blade is disposed in the cylindrical portion of the exhaust passageway.

In some configurations, the one of the parallel plates and the auger blade cooperate to form a monolithic body.

In some configurations, the mixer assembly includes a plurality of auger blades.

In some configurations, two of the auger blades extend in different rotational directions.

In some configurations, an axis of rotation of at least one of the auger blades is offset from a longitudinal axis of the cylindrical portion of the exhaust passageway.

In some configurations, the auger blades have different pitches.

In some configurations, the plurality of parallel plates are at least partially disposed within an annular housing, and the auger blade has a larger outer diameter than an outer diameter of the annular housing.

In some configurations, the plurality of parallel plates are at least partially disposed within an annular housing, and the auger blade has an outer diameter that is equal to an outer diameter of the annular housing.

In some configurations, the mixer assembly includes a deflector plate extending from one of the parallel plates. The deflector plate may be angled away from the auger blade.

In some configurations, the mixer assembly defines at least three flow paths. The deflector plate may define first and second ones of the at least three flow paths. The auger blade may define a third one of the at least three flow paths.

In some configurations, the mixer assembly includes a ridge formed on a stem plate that connects the auger blade with one of the parallel plates.

In some configurations, the parallel plates include main bodies that are parallel to each other and parallel to a longitudinal axis of an annular housing in which the parallel plates are disposed. The parallel plates may include tabs disposed at distal ends of the main bodies. The tabs may be angled relative to the main bodies and the longitudinal axis of the annular housing.

In some configurations, the aftertreatment device is a selective catalytic reduction catalyst, and the fluid injected by the injector is a reductant.

In some configurations, the exhaust aftertreatment system includes an oxidation catalyst and a particulate filter. The particulate filter may be disposed upstream of the injector, and the oxidation catalyst may be disposed upstream of the particulate filter.

In some configurations, the at least two flow paths are equal divisions of a total flow through the mixer assembly.

In some configurations, the at least two flow paths are unequal divisions of a total flow through the mixer assembly.

In some configurations, the conical portion has a longitudinal axis that is angled relative to a longitudinal axis of the cylindrical portion.

In some configurations, the curved portion intersects the cylindrical portion at an angle relative to the longitudinal axis of the cylindrical portion.

In some configurations, upstream ends of at least some of the parallel plates are offset from each other in an axial direction.

In some configurations, the upstream end of one of the parallel plates that is furthest away from an intersection of the curved portion and the cylindrical portion is further axially upstream than the upstream ends of the rest of the parallel plates.

In some configurations, the plurality of parallel plates are at least partially disposed within an annular housing. The first and second axial ends of the annular housing are angled at a non-perpendicular angle relative to a longitudinal axis of the annular housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic representation of an exhaust aftertreatment system having a mixer assembly according to the principles of the present disclosure;

FIG. 2 is a partial cross-sectional view of an exhaust gas passageway of the exhaust aftertreatment system with the mixer assembly of FIG. 1;

Corresponding reference numerals indicate corresponding parts throughout the several views of the drawings.

DETAILED DESCRIPTION

Figure 3:
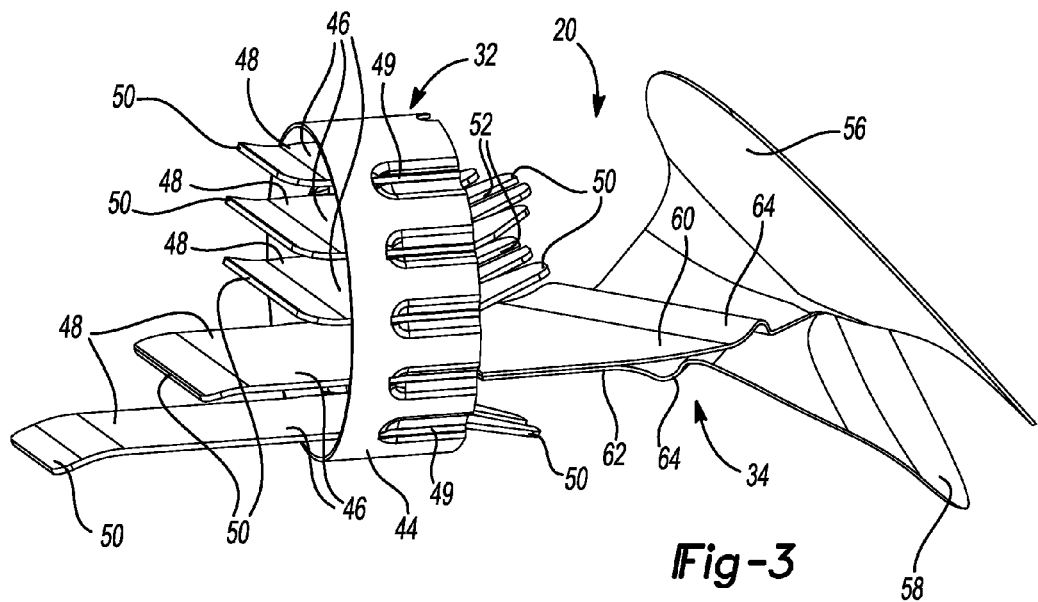
FIG. 3 is a perspective view of the mixer assembly of FIG. 2.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may treat exhaust gas output by a combustion engine 12. The exhaust aftertreatment system 10 may include an exhaust gas passageway 14, an oxidation catalyst (e.g., a diesel oxidation catalyst or DOC) 16, a filter (e.g., a diesel particulate filter (DPF)) 18, a mixer assembly 20 and a selective catalytic reduction (SCR) catalyst 22. The DOC 16, filter 18, mixer assembly 20 and SCR catalyst 22 are disposed within the exhaust gas passageway 14 such that some or all of the that exhaust gas output from engine 12 flows therethrough.

A hydrocarbon (HC) injector 24 may be disposed at least partially within the exhaust gas passageway 14 upstream of the DOC 16. The HC injector 24 may receive hydrocarbon fuel from a fuel source 26 and may inject the fuel into the stream of exhaust gas upstream of the DOC 16. A burner (not shown) may be disposed at least partially within the exhaust gas passageway 14 upstream of the DOC 16 at or adjacent the HC injector 24. The burner may ignite the fuel injected by the HC injector 24 to regenerate the DOC 16 and/or the filter 18.

A reductant injector 28 may be disposed upstream of or partially within the mixer assembly 20, which is upstream of the SCR catalyst 22. The reductant injector 28 may receive a reductant (e.g., urea) from a reductant tank 30 and inject the reductant into an exhaust stream upstream of or in the mixer assembly 20. The reductant may mix with exhaust gas within the mixer assembly 20 prior to flowing through the SCR catalyst 22. The mixer assembly 20 may divide the flow of exhaust gas into at least two flow paths and facilitates atomization and evaporation of the reductant.

Figure 4:
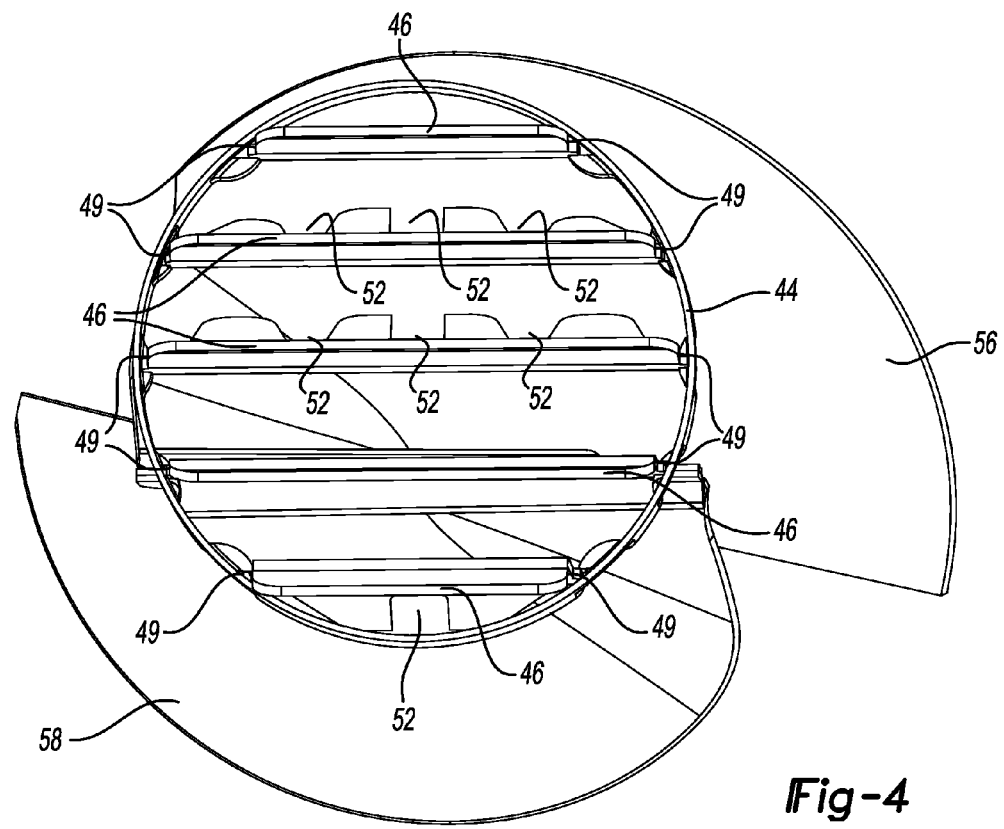
FIG. 4 is a plan view of the mixer assembly of FIG. 2.

Referring now to FIGS. 2-4, the mixer assembly 20 may include a first stage 32 and a second stage 34. As shown in FIG. 2, the first stage 32 may be disposed within a cylindrical portion 36 of the exhaust gas passageway 14. In some configurations, the cylindrical portion 36 may be disposed directly between a curved portion 38 of the exhaust gas passageway 14 and an oblique conical portion 40 of the exhaust gas passageway 14. As shown in FIG. 2, the reductant injector 28 may extend through an upstream axial end 42 of the cylindrical portion 36 proximate the curved portion 38. In this manner, reductant from the reductant injector 28 can be injected into a stream of exhaust gas as the exhaust gas enters the cylindrical portion 36 from the curved portion 38.

The first stage 32 may include an annular housing 44 and a plurality of generally parallel plates 46. The annular housing 44 may be fixed within the cylindrical portion 36 of the exhaust gas passageway 14. Each of the plates 46 may include a main body 48 having edges 49 that engage the annular housing 44. The main bodies 48 of all of the plates 46 may be parallel to each other and to a longitudinal axis A1 of the cylindrical portion 36 and annular housing 44. Some or all of the plates 46 can include inclined tabs 50 at upstream and/or downstream ends of the main bodies 48. The tabs 50 are angled relative to the main bodies 48 and the longitudinal axis A1. In the particular configuration shown in FIGS. 2-4, tabs 50 at the downstream ends of some of the plates 46 include slots or notches 52. In the configuration shown in FIG. 2, the reductant injector 28 is disposed proximate to a longitudinal axis A1 and an injection axis may be substantially parallel to the longitudinal axis A1. In other configurations, the reductant injector 28 could be disposed along the longitudinal axis A1. In some configurations, the injection axis of the injector 28 could be angled relative to the longitudinal axis A1. In some configurations, the injector 28 could inject reductant into the curved portion 38 of the exhaust gas passageway 14.

The particular shape, size and orientation of the tabs 50 can be tailored or tuned to suit a given application and flow characteristics in the exhaust gas passageway 14. Furthermore, the length of each individual plate 46 (i.e., the length in the direction along the longitudinal axis A1) may vary depending on the given application and the flow characteristics in the exhaust gas passageway 14. For example, in the configuration shown in FIG. 2, the plates 46 whose main bodies 48 are disposed on planes that intersect or are near an intersection 54 of the curved portion 38 and the cylindrical portion 36 of the exhaust gas passageway 14 may be relatively shorter in length; whereas the plates 46 whose main bodies 48 are disposed on planes that are further from the intersection 54 may be relatively longer in length.

In the configuration shown in FIGS. 2-4, the second stage 34 of the mixer assembly 20 may include first and second auger blades 56, 58 that may extend into the conical portion 40 of the exhaust gas passageway 14. The first and second auger blades 56, 58 may include first and second stem plates 60, 62, respectively, that are attached to one of the plates 46 of the first stage 32. In the configuration of FIGS. 2-4, both of the stem plates 60, 62 are attached to and extend downstream from the same plate 46 (i.e., the plate 46 that extends along the longitudinal axis A1). In other configurations, however, the stem plates 60, 62 can be attached to and extend downstream from different plates 46 so that the stem plates 60, 62 are spaced apart from each other and define a separate flow path therebetween. In such configurations, an additional flow separator (not shown) can be disposed at or near the downstream outlet of the auger blades 56, 58 and can be tuned to manage flow uniformity at the inlet face of the SCR catalyst 22.

The stem plates 60, 62 can be integrally formed with the one or more plates 46 or the stem plates 60, 62 could be separate components fixedly attached to the one or more plates 46. In some configurations, one or both of the stem plates 60, 62 may include one or more ridges 64 that may span the width of the stem plates 60, 62. The ridges 64 can be designed to influence exhaust flow and mixing of the reductant with the exhaust gas in a desired manner. The number of ridges 64 as well as the height, length and shape of each ridge 64 can vary to suit a given application.

In some configurations, radial outer edges of the auger blades 56, 58 may contact an inner diametrical surface 66 of the conical portion 40 of the exhaust gas passageway 14. In some configurations, the auger blades 56, 58 could be disposed partially or entirely within the cylindrical portion 36 of the exhaust gas passageway and can contact an inner diametrical surface of the cylindrical portion 36. In some configurations, the first auger blade 56 can have a different size, shape, orientation and/or pitch angle than the second auger blade 58. In other configurations, the first and second auger blades 56, 58 could be identical to each other. In some configurations, the first and second auger blades 56, 58 can extend rotationally between about 180 and 720 degrees, for example. In some configurations, additional auger blades 56, 58 may be disposed downstream of the first and second auger blades 56, 58 shown in the figures.

The first and second auger blades 56, 58 may divide the flow of exhaust gas and reductant within the exhaust gas passageway 14 into two separate generally helical flow paths 68, 70, as shown in FIG. 2. It will be appreciated that additional auger blades could be provided to further divide the flow of exhaust gas and reductant within the exhaust gas passageway 14 into more than two separate flow paths.

During operation of the engine 12, the mixer assembly 20 facilitates atomization and evaporation of the reductant. In some configurations, atomization may occur as the reductant flows through the first stage 32 and/or as the reductant enters the second stage 34 (i.e., in the proximity of the stem plates 60, 62 and/or on upstream surfaces of the auger blades 56, 58). In some configurations, evaporation of the reductant may begin at the upstream entrance of the auger blades 56, 58 and may be completed at or near the downstream outlets of the auger blades 56, 58 (adjacent the SCR catalyst 22).

The design of the mixer assembly 20 is versatile and can be tuned and/or modified to suit a given application or flow characteristics. That is, the shape, placement, sizes and number of plates 46, tabs 50, notches 52, stem plates 60, 62, ridges 64, and/or auger blades 56, 58 can be tuned as desired.

While the mixer assembly 20 is described above as mixing exhaust gas with reductant from the reductant injector 28 and providing the mixture to the SCR catalyst 22, it will be appreciated that the mixer assembly 20 could be used in conjunction with the HC injector 24 rather than the reductant injector 28. That is, the mixer assembly 20 could be provided upstream of the DOC 16, and the HC injector 24 could inject fuel into or upstream of the mixer assembly 20 to be mixed with the exhaust gas prior to being ignited.

Figure 5:
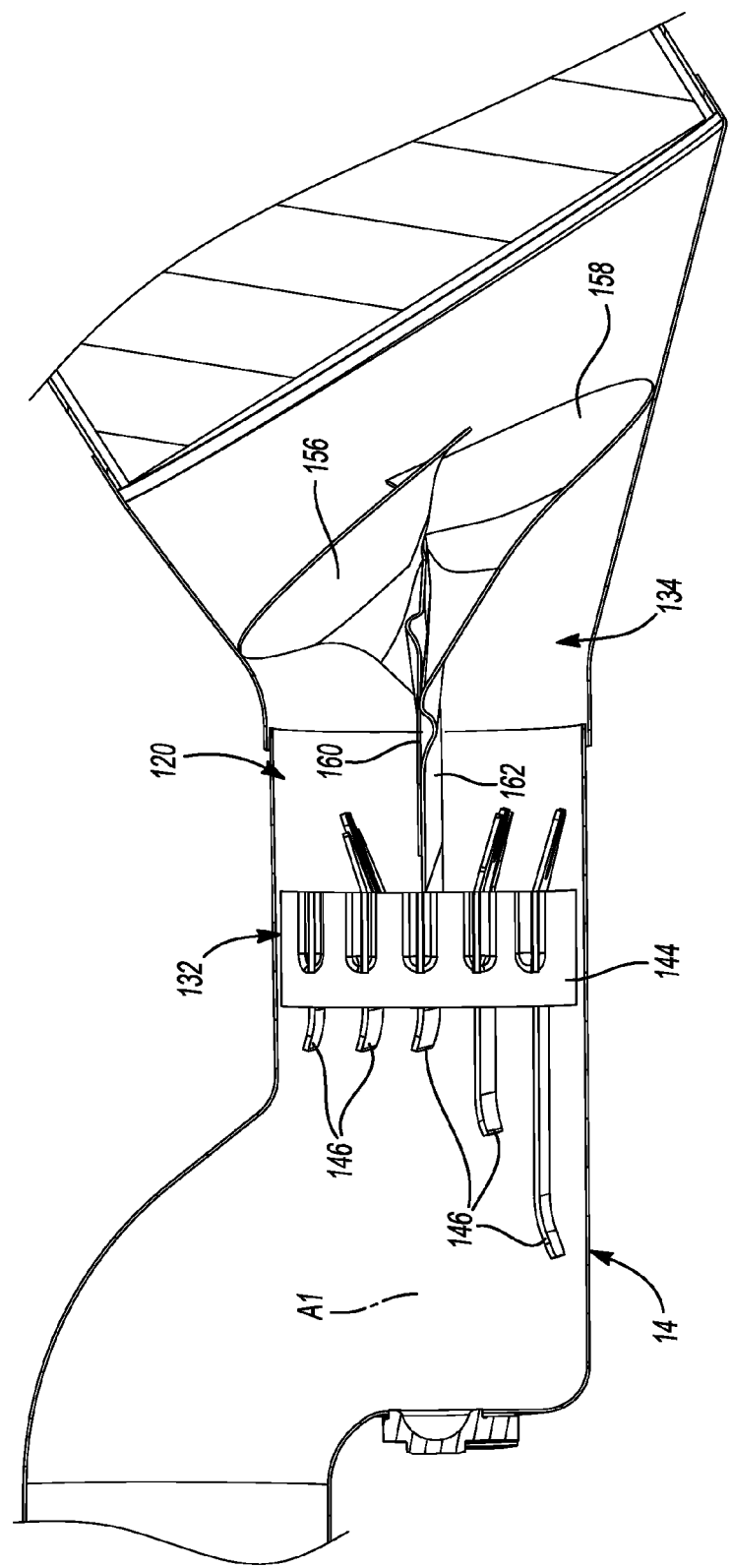
FIG. 5 is a partial cross-sectional view of the exhaust gas passageway with another mixer assembly according to the principles of the present disclosure.
Figure 6:
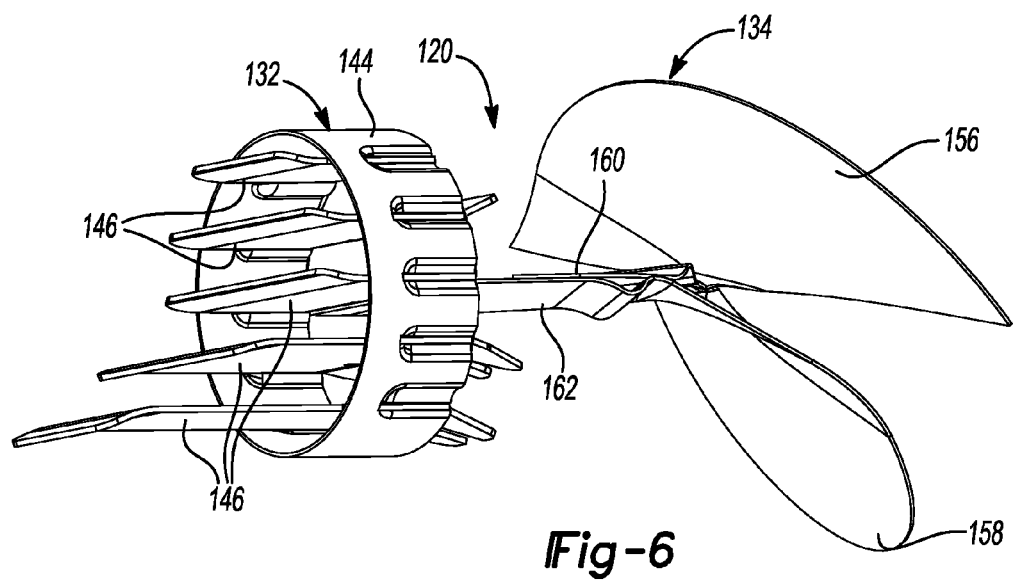
FIG. 6 is a perspective view of the mixer assembly of FIG. 5.
Figure 7:
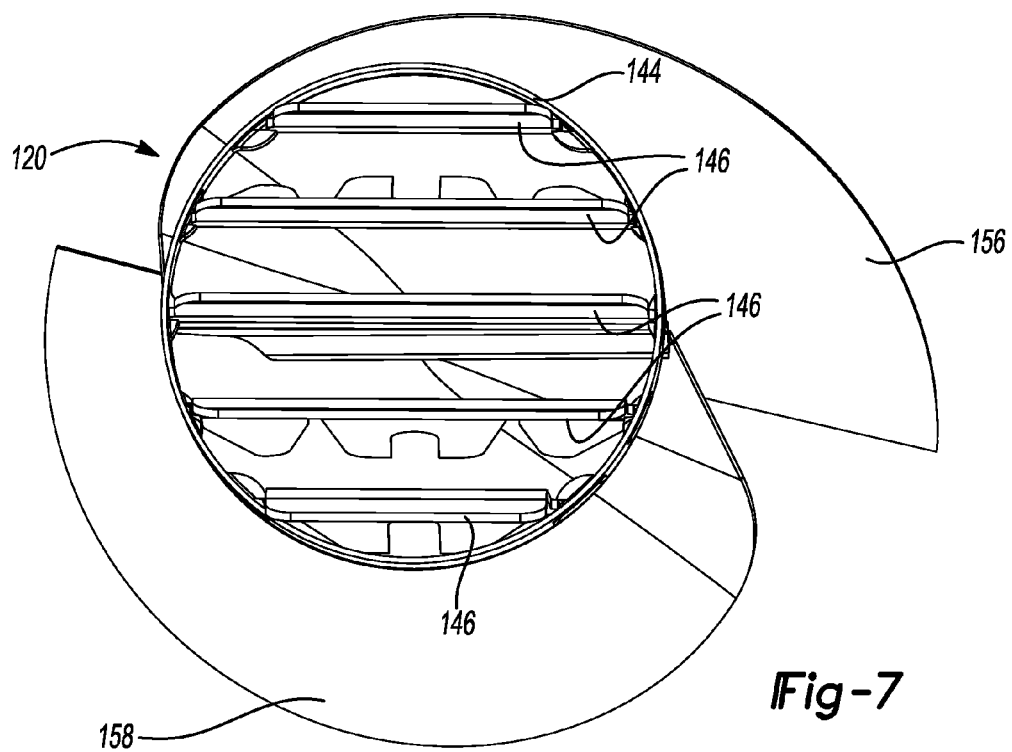
FIG. 7 is a plan view of the mixer assembly of FIG. 5.

Referring now to FIGS. 5-7, another mixer assembly 120 is provided that may be installed in the exhaust gas passageway 14 instead of the mixer assembly 20. The mixer assembly 120 may include a first stage 132 and a second stage 134. The first and second stages 132, 134 may be similar or identical to the first and second stages 32, 34 described above, apart from exceptions described below and/or shown in the figures.

Like the first stage 32, the first stage 132 may include a plurality of plates 146 that are arranged generally parallel to each other and attached to an annular housing 144. Like the second stage 34, the second stage 134 may include first and second auger blades 156, 158 having first and second stem plates 160, 162. Unlike the mixer assembly 20 (where the stem plates 60, 62 extend from a plate 46 that is offset from the longitudinal axis A1), the stem plates 160, 162 extend from and are attached to a central one of the plates 146 that extends along or proximate to the longitudinal axis A1.

Figure 8:
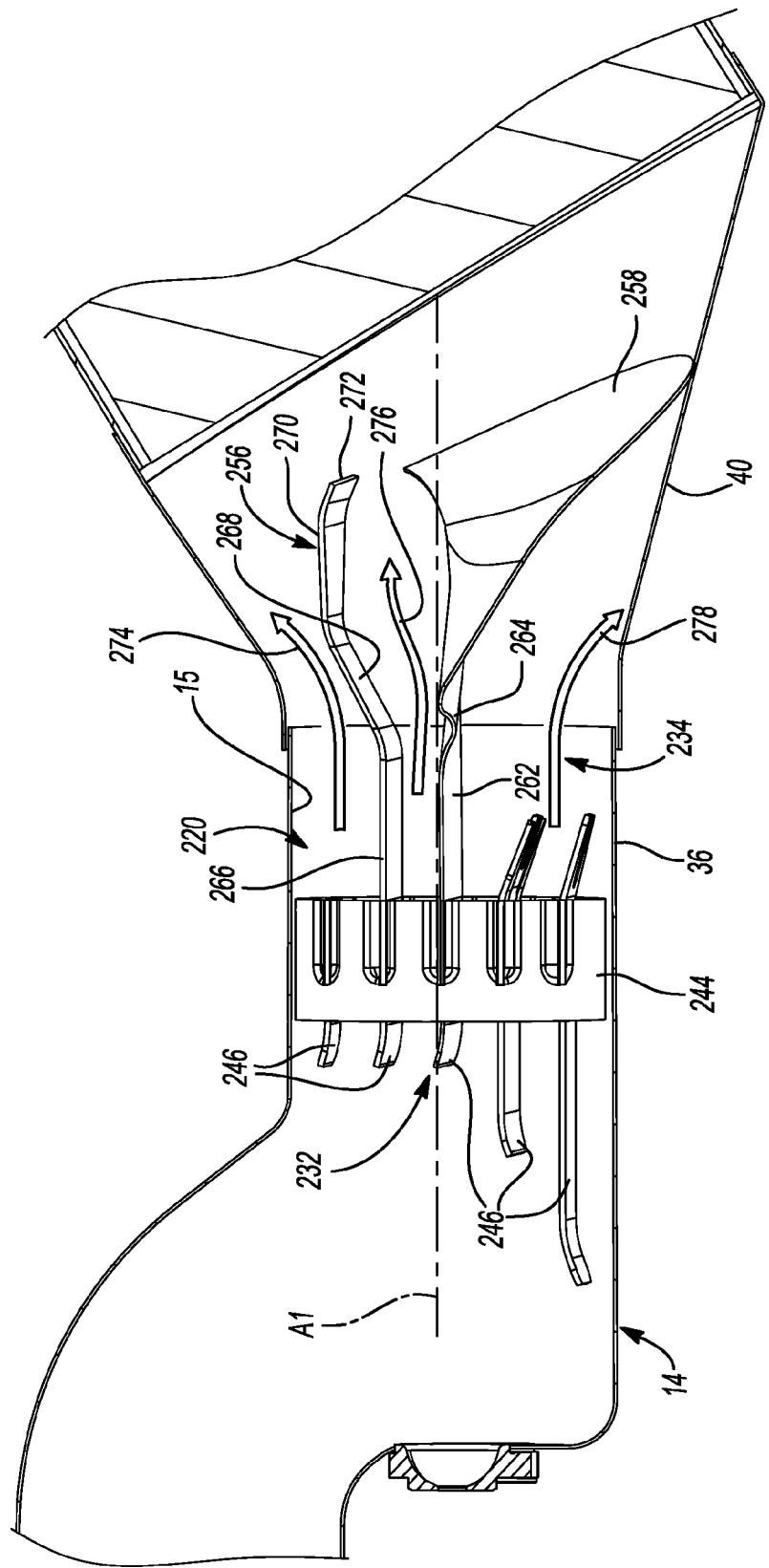
FIG. 8 is a partial cross-sectional view of the exhaust gas passageway with another mixer assembly according to the principles of the present disclosure.
Figure 9:
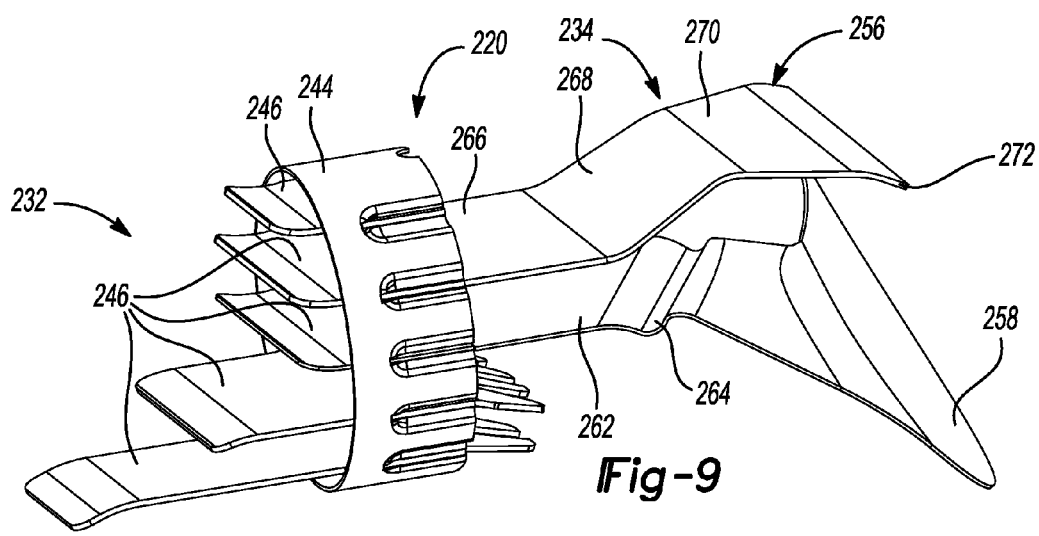
FIG. 9 is a perspective view of the mixer assembly of FIG. 8.
Figure 10:
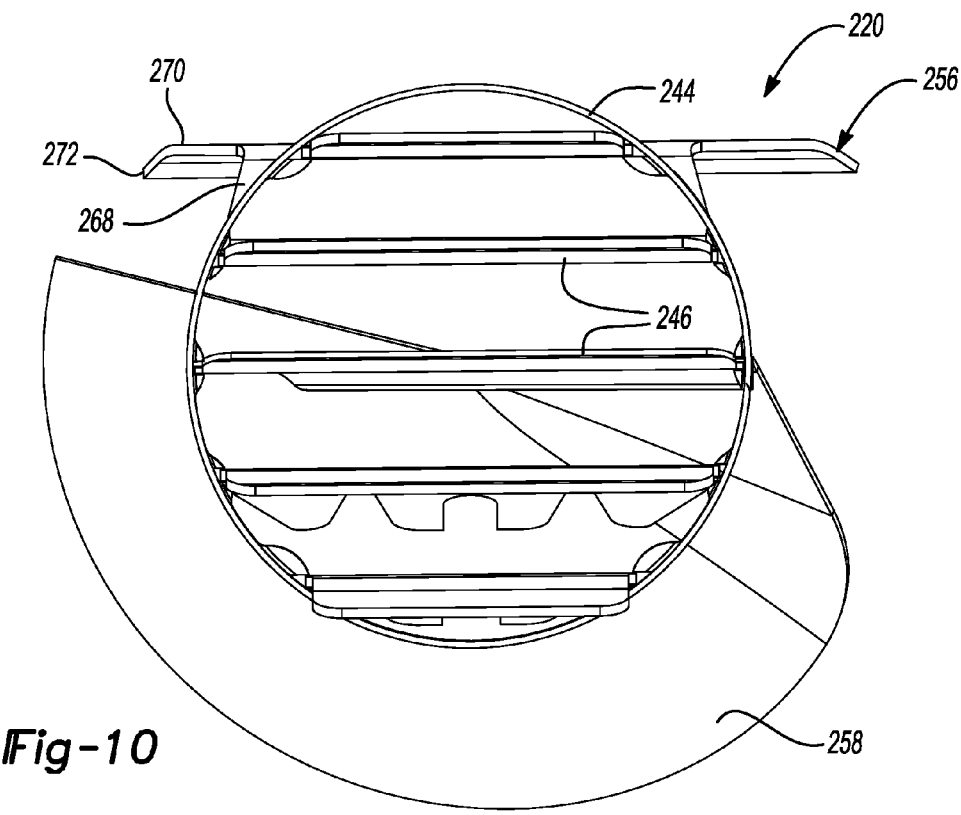
FIG. 10 is a plan view of the mixer assembly of FIG. 8.

Referring now to FIGS. 8-10, another mixer assembly 220 is provided that may be installed in the exhaust gas passageway 14 instead of the mixer assembly 20. The mixer assembly 220 may include a first stage 232 and a second stage 234. The first and second stages 232, 234 may be similar or identical to the first and second stages 132, 134 described above, apart from exceptions described below and/or shown in the figures.

Like the first stage 32, the first stage 232 may include a plurality of plates 246 attached to an annular housing 244. The plates 246 and housing 244 could be similar or identical to the plates 46, 146 and housing 44, 144, respectively.

Unlike the second stage 134, the second stage 234 includes a deflector plate 256 and only a single blade 258. The blade 258 a stem plate 262 having a ridge 264 (similar or identical to the ridges 64 described above). the stem plate 262 may extend from one of the plates 246 of the first stage 232. In the particular configuration shown in FIGS. 8-10, the stem plate 262 may extend from a central one of the plates 246 that extends along or proximate to the longitudinal axis A1.

The deflector plate 256 may be spaced apart from the stem plate 262 and may extend from one of the plates 246 that is offset from the longitudinal axis A1. An upstream portion 266 of the deflector plate 256 may extend substantially parallel to the stem plate 262. An intermediate portion 268 of the deflector plate 256 may be angled relative to the upstream portion 266 and the longitudinal axis A1 such that intermediate portion 268 extends away from the blade 258 as the intermediate portion 268 extends downstream. A downstream portion 270 of the deflector plate 256 can be angled relative to the intermediate portion 268. In some configurations, a distal end 272 of the deflector plate 256 may be angled relative to some or all of the portions 266, 268, 270 and may extend toward the longitudinal axis A1 as it extends downstream. In some configurations, the intermediate portion 268, the downstream portion 270 and the distal end 272 may be at least partially disposed in the conical portion 40 of the exhaust gas passageway 14. The upstream portion 266 may be disposed partially or entirely within the cylindrical portion 36 of the exhaust gas passageway 14.

The deflector plate 256 and the blade 258 may cooperate to define three separate flows paths through the second stage 234. A first flow path 274 may be disposed between the deflector plate 256 and an inner wall 15 of the exhaust gas passageway 14. A second flow path 276 may be disposed between the deflector plate 256 and the blade 258. A third flow path 278 may be disposed between the blade 258 and an inner wall 15 of the exhaust gas passageway 14.

As shown in FIG. 8, the first flow path 274 between the deflector plate 256 and an inner wall 15 of the exhaust gas passageway 14 forms a venturi (i.e., the distance between intermediate portion 268 and the inner wall 15 is less than the distance between the upstream portion 266 and the inner wall 15). The venturi speeds up the fluid flow in the first flow path 274 and prevents reductant droplets from impinging on the inner wall 15.

While the deflector plate 256 is shown in FIG. 8 as extending from the plate 246 in the second-from-the-top position and the intermediate portion 268 is shown in FIG. 8 as being angled away from the blade 258, in some configurations, the deflector plate 256 may extend from the top plate 246 and the intermediate portion 268 may be angled toward the blade 258. In this configuration, a venturi may be defined between the deflector plate 256 and the blade 258 or stem plate 262.

Figure 11:
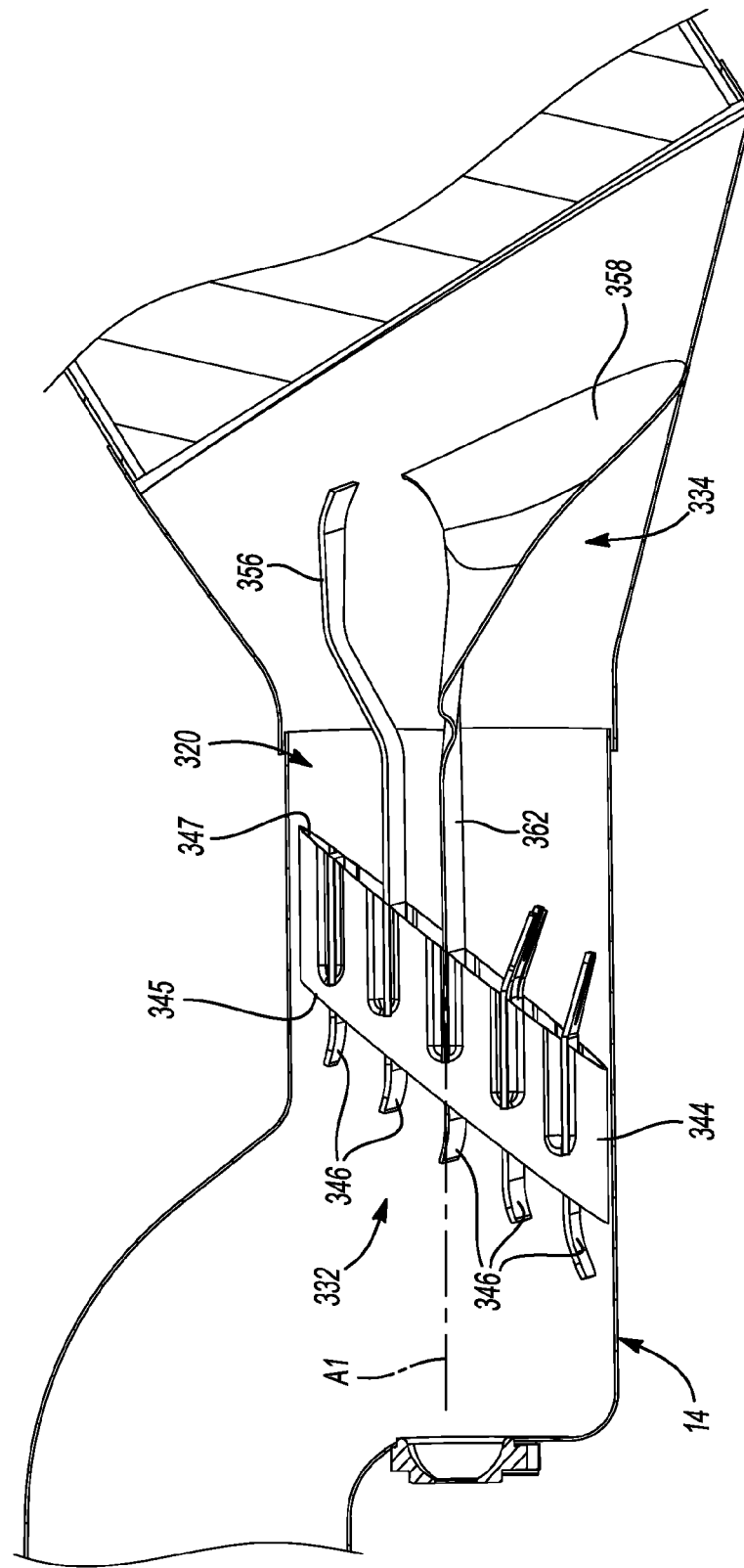
FIG. 11 is a partial cross-sectional view of the exhaust gas passageway with another mixer assembly according to the principles of the present disclosure.
Figure 12:
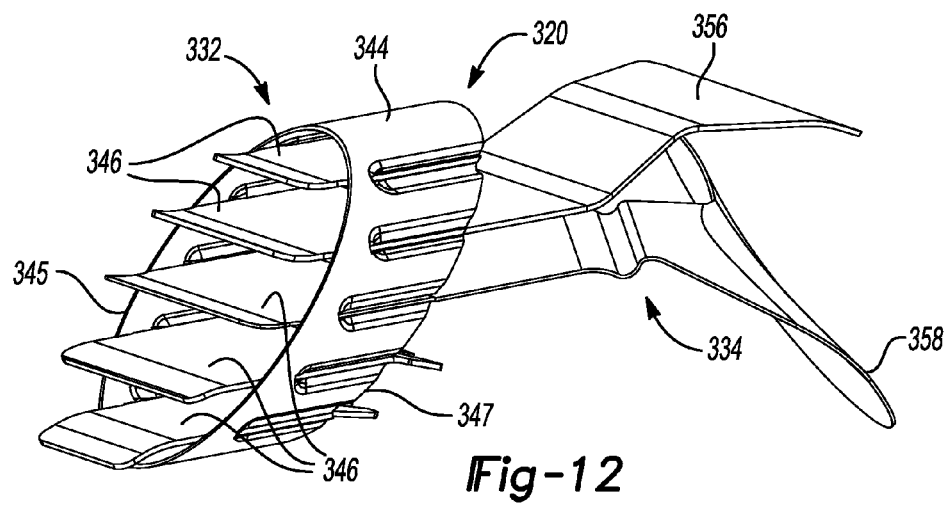
FIG. 12 is a perspective view of the mixer assembly of FIG. 11.
Figure 13:
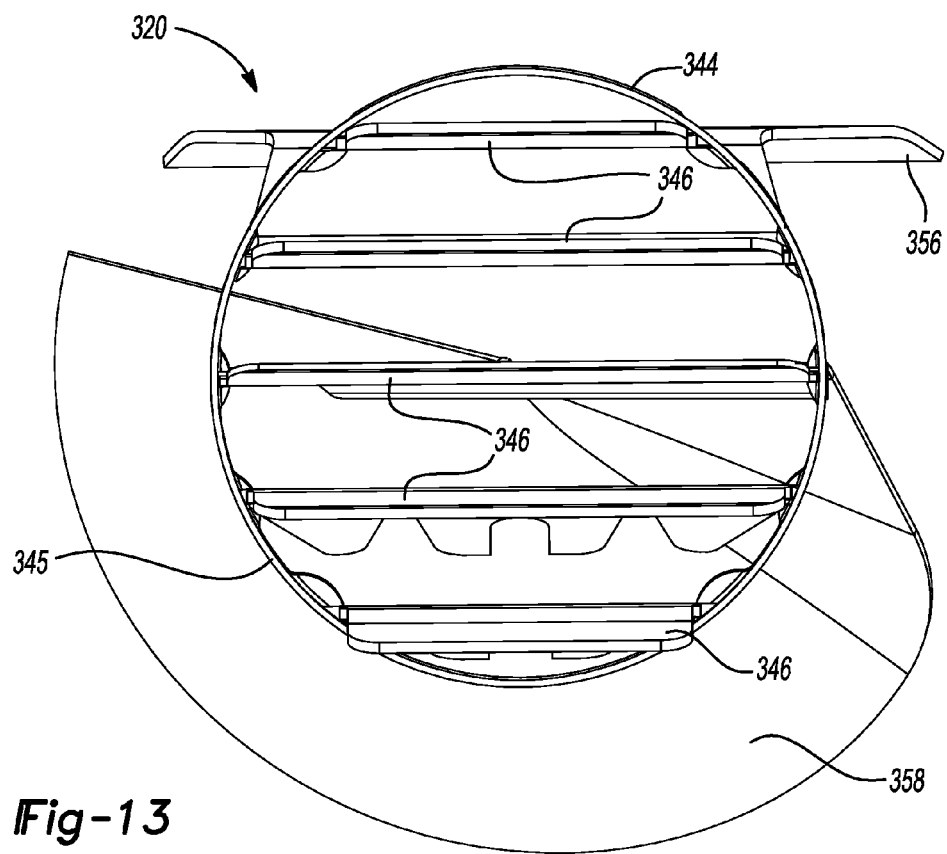
FIG. 13 is a plan view of the mixer assembly of FIG. 11.

Referring now to FIGS. 11-13, another mixer assembly 320 is provided that may be installed in the exhaust gas passageway 14 instead of the mixer assembly 20. The mixer assembly 320 may include a first stage 332 and a second stage 334. The first and second stages 332, 334 may be similar or identical to the first and second stages 232, 234 described above, apart from exceptions described below and/or shown in the figures.

Like the first stage 232, the first stage 332 may include a plurality of plates 346 attached to an annular housing 344. Unlike the housing 244 shown in FIG. 8, the housing 344 shown in FIGS. 11-13 is angled relative to the longitudinal axis A1. That is, the housing 344 may include first and second axial ends 345, 347 that define planes that are parallel to each other and disposed at non-perpendicular angles relative to the longitudinal axis A1.

Like the second stage 234, the second stage 334 may include a deflector plate 356 and a blade 358. The deflector plate 356 and blade 358 may be similar or identical to the deflector plate 256 and blade 258 described above, and may cooperate to define three separate flow paths, as described above.

Figure 14:
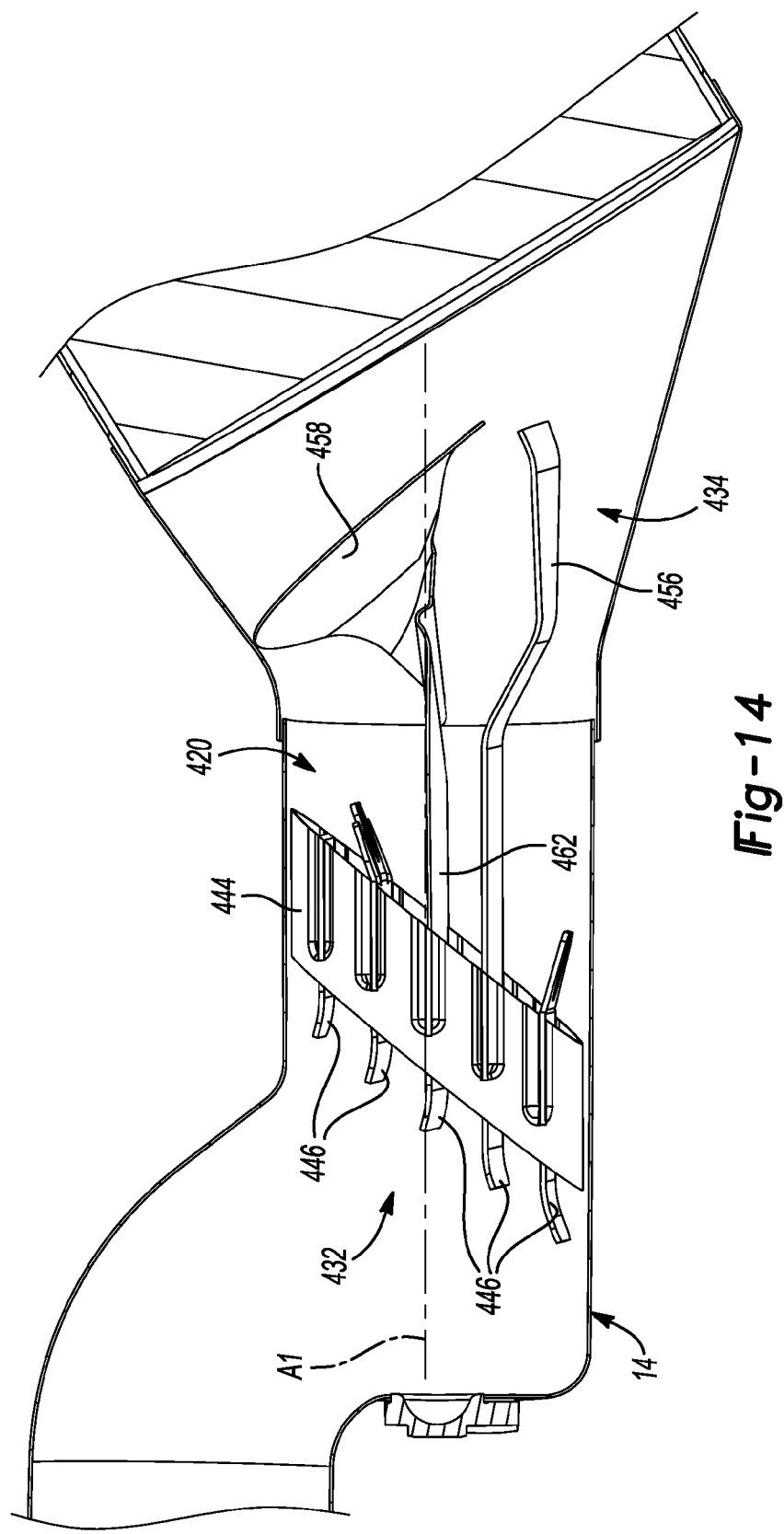
FIG. 14 is a partial cross-sectional view of the exhaust gas passageway with another mixer assembly according to the principles of the present disclosure.
Figure 15:
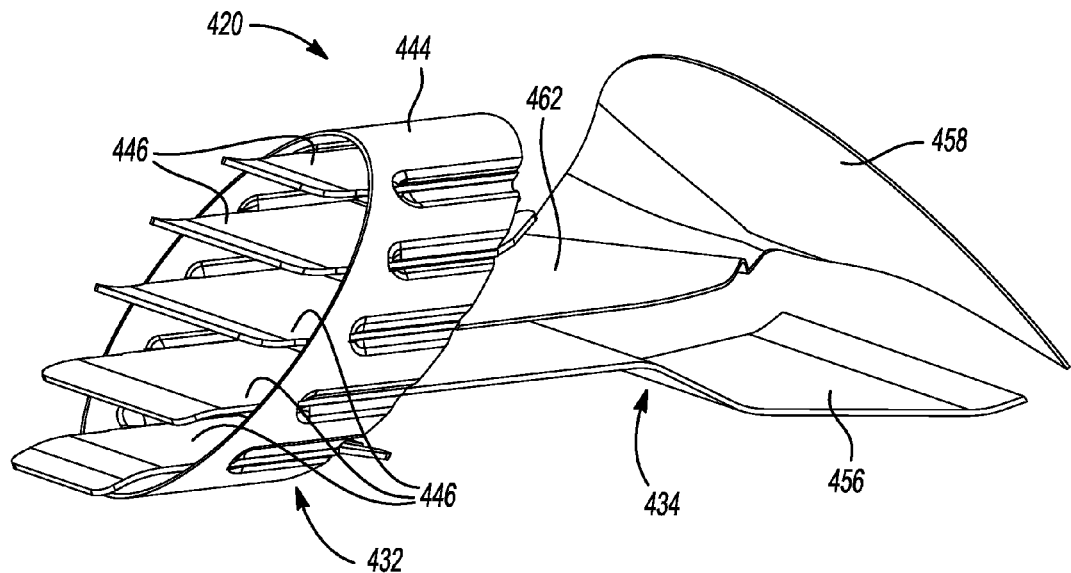
FIG. 15 is a perspective view of the mixer assembly of FIG. 14.
Figure 16:
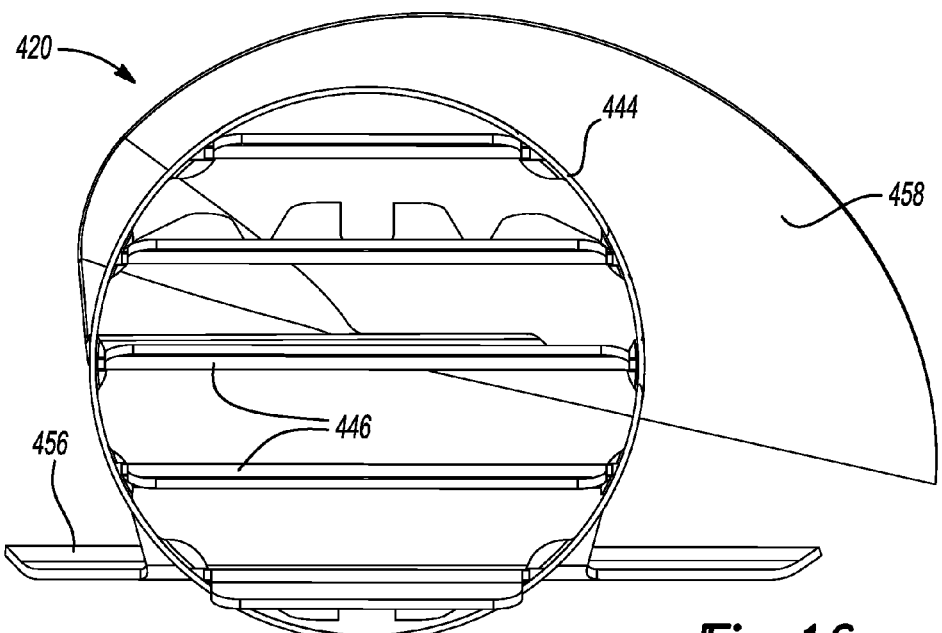
FIG. 16 is a plan view of the mixer assembly of FIG. 14.

Referring now to FIGS. 14-16, another mixer assembly 420 is provided that may be installed in the exhaust gas passageway 14 instead of the mixer assembly 20. The mixer assembly 420 may include a first stage 432 and a second stage 434. The first and second stages 432, 434 may be similar or identical to the first and second stages 332, 334 described above, apart from exceptions described below and/or shown in the figures.

Like the first stage 332, the first stage 432 may include a plurality of plates 446 attached to an annular housing 444. Like the second stage 334, the second stage 434 may include a deflector plate 456 and a single blade 458. A stem plate 462 of the blade 458 may extend from one of the plates 446 that extends along or proximate to the longitudinal axis A1. The blade 458 may extend radially outward from the stem plate 462 in a direction that is opposite the radial direction in which the blade 358 extends from stem plate 362. Further, the deflector plate 456 may be positioned relative to the exhaust gas passageway 14 one-hundred-eight degrees apart (about the longitudinal axis A1) from the relative positioning of the deflector plate 356 within the exhaust gas passageway 14 (compare FIGS. 11 and 14).

Figure 17:
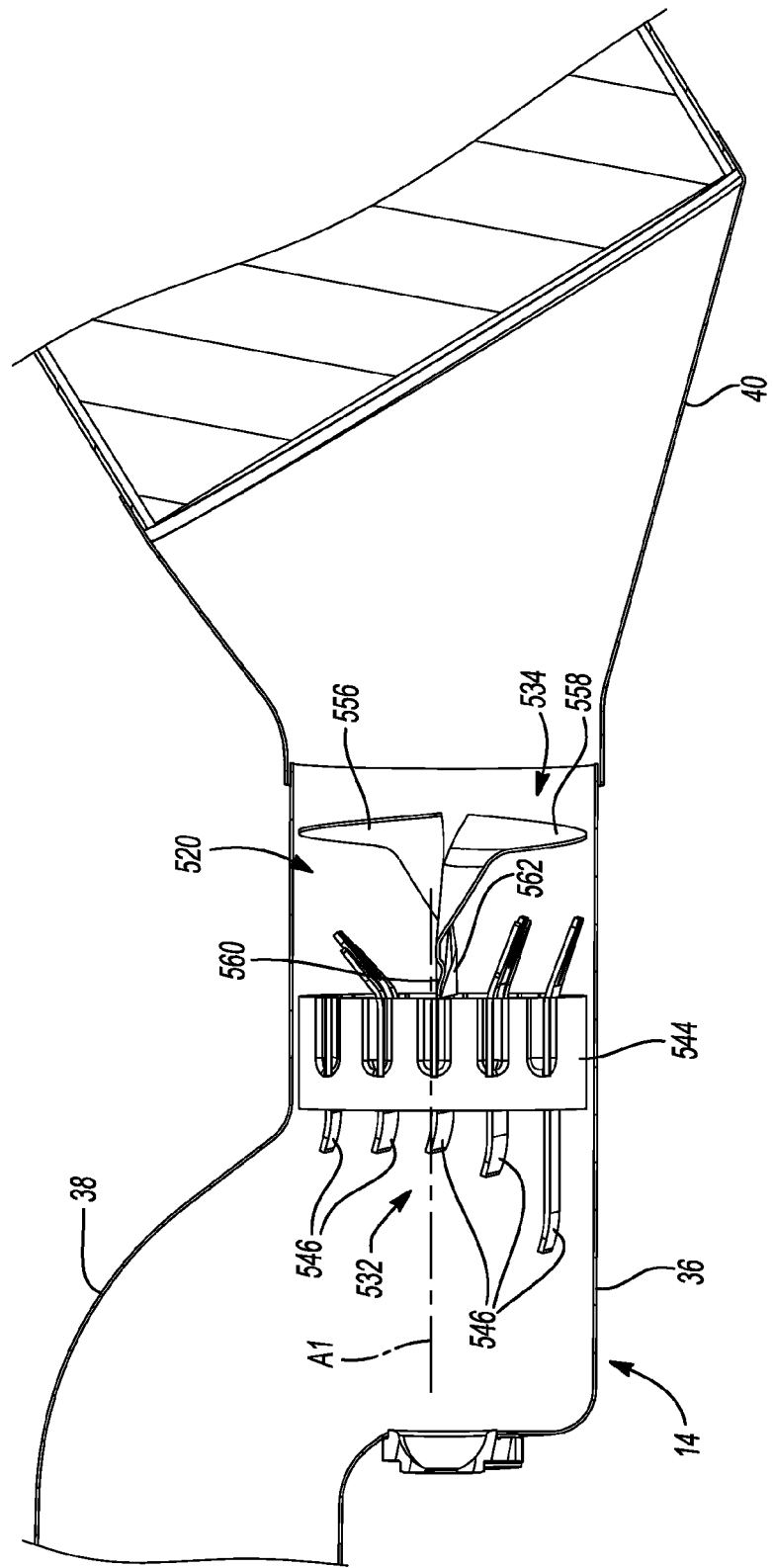
FIG. 17 is a partial cross-sectional view of the exhaust gas passageway with another mixer assembly according to the principles of the present disclosure.
Figure 18:
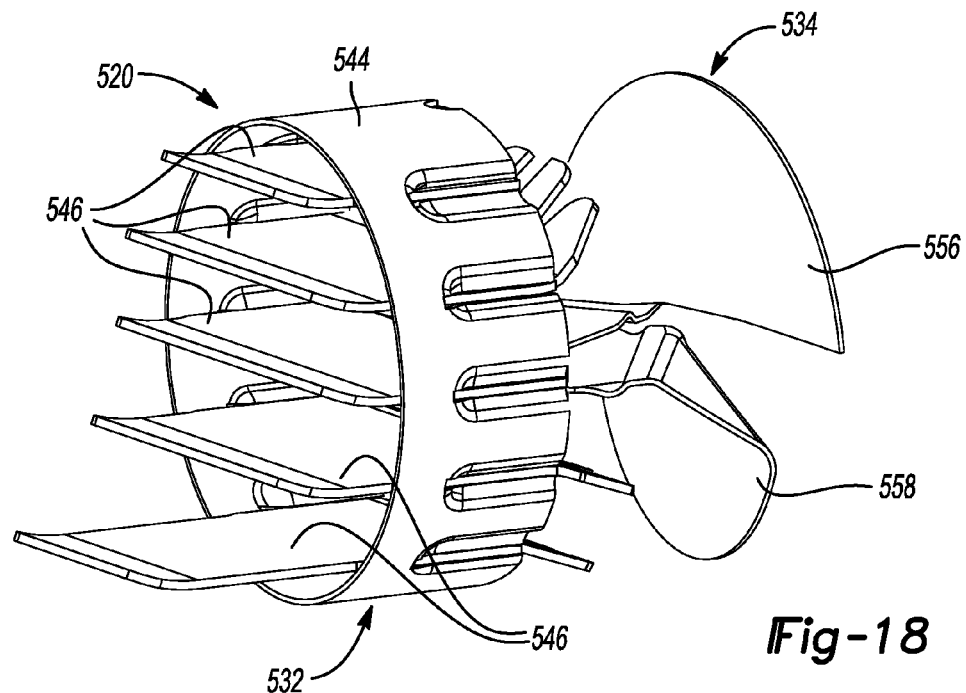
FIG. 18 is a perspective view of the mixer assembly of FIG. 17.
Figure 19:
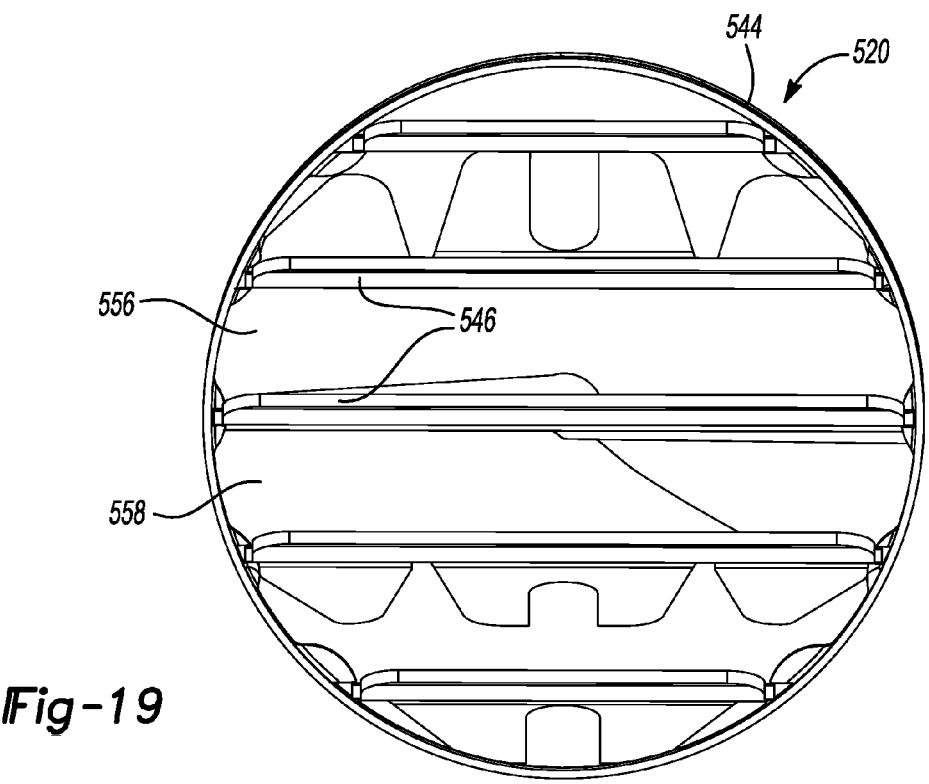
FIG. 19 is a plan view of the mixer assembly of FIG. 17.

Referring now to FIGS. 17-19, another mixer assembly 520 is provided that may be installed in the exhaust gas passageway 14 instead of the mixer assembly 20. The mixer assembly 520 may include a first stage 532 and a second stage 534. The first and second stages 532, 534 may be similar or identical to the first and second stages 32, 132, 34, 134 described above, apart from exceptions described below and/or shown in the figures.

Like the first stage 32, the first stage 532 may include a plurality of plates 546 attached to an annular housing 544. The second stage 534 may include first and second blades 556, 558 that may be disposed entirely within the cylindrical portion 36 of the exhaust gas passageway 14. Stem plates 560, 562 of the blades 556, 558 may be attached to or integrally formed with the same one of the plates 546 of the first stage 532. In the configuration shown in FIG. 17, the stem plates 560, 562 extend from the plate 546 that extends along or proximate to the longitudinal axis A1. The blades 556, 558 may have the same diameters and pitches, but may extend in opposite rotational directions. The diameters of the blades 556, 558 may be approximately the same as the diameter of the annular housing 544. In some configurations, additional auger blades 556, 558 may be disposed downstream of the first and second auger blades 556, 558 shown in the figures.

Figure 20:
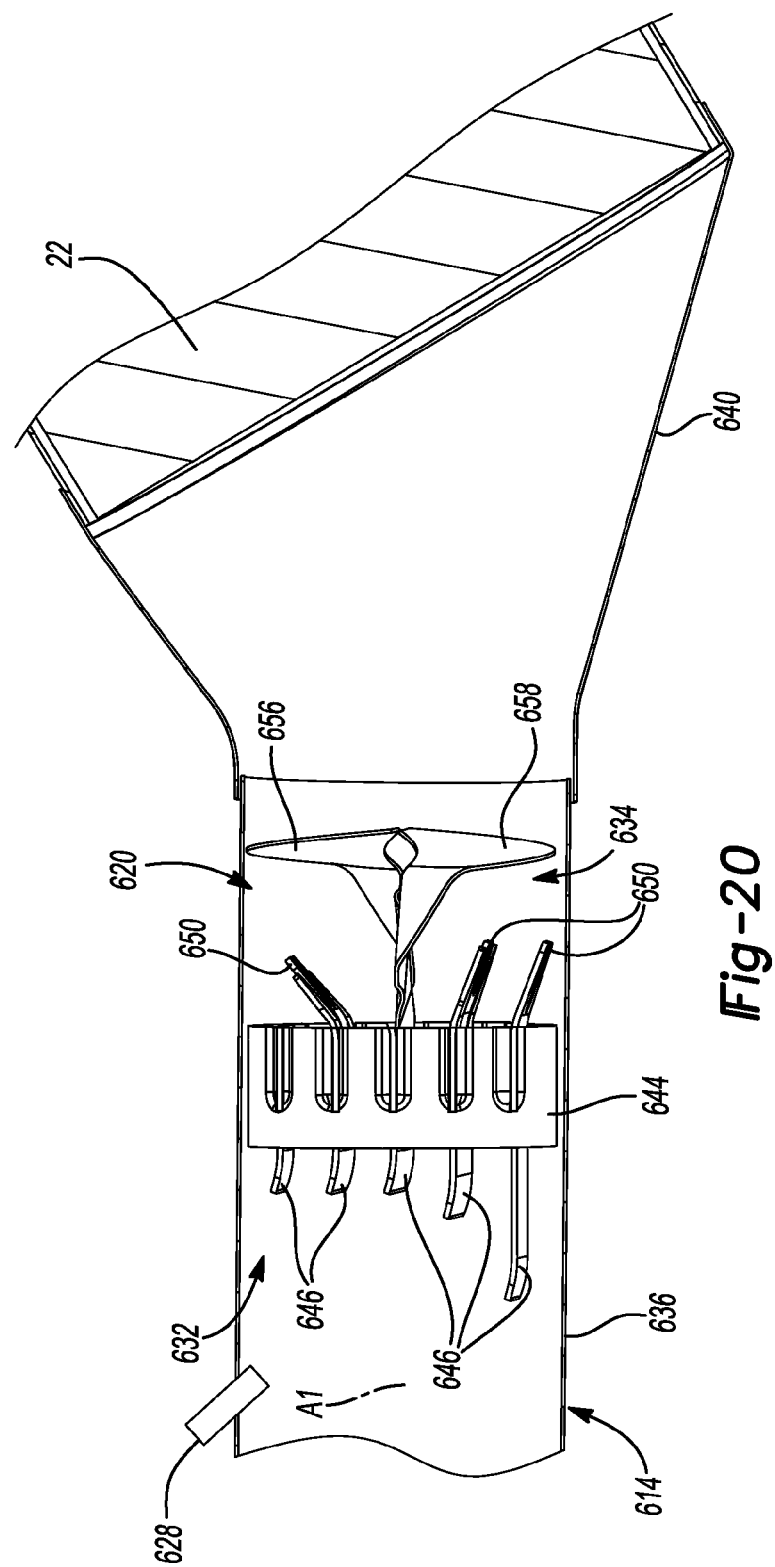
FIG. 20 is a partial cross-sectional view of another exhaust gas passageway with a mixer assembly according to the principles of the present disclosure.

Referring now to FIG. 20, another mixer assembly 620 is provided that may be installed in another exhaust gas passageway 614. The mixer assembly 620 may be similar or identical to the mixer assembly 520 or any other mixer assembly described herein and/or shown in the figures. The exhaust gas passageway 614 can be generally similar to the exhaust gas passageway 14 described above, apart from the exceptions described below and/or shown in the figures.

Unlike exhaust gas passageway 14, the exhaust gas passageway 614 may not include a curved portion (like curved portion 38) disposed immediately upstream of the mixer assembly 620. Furthermore, a reductant injector 628 (which may be similar to injector 28) may extend through a cylindrical portion 636 of the exhaust gas passageway 614 at an angle relative to longitudinal axis A1 of the cylindrical portion 636. While FIG. 20 depicts the exhaust gas passageway 614 having a conical portion 640 disposed between the mixer assembly 620 and the SCR catalyst 22, in some configurations, the exhaust gas passageway 14 could be entirely cylindrical between the mixer assembly 620 and the SCR catalyst 22.

Figure 21:
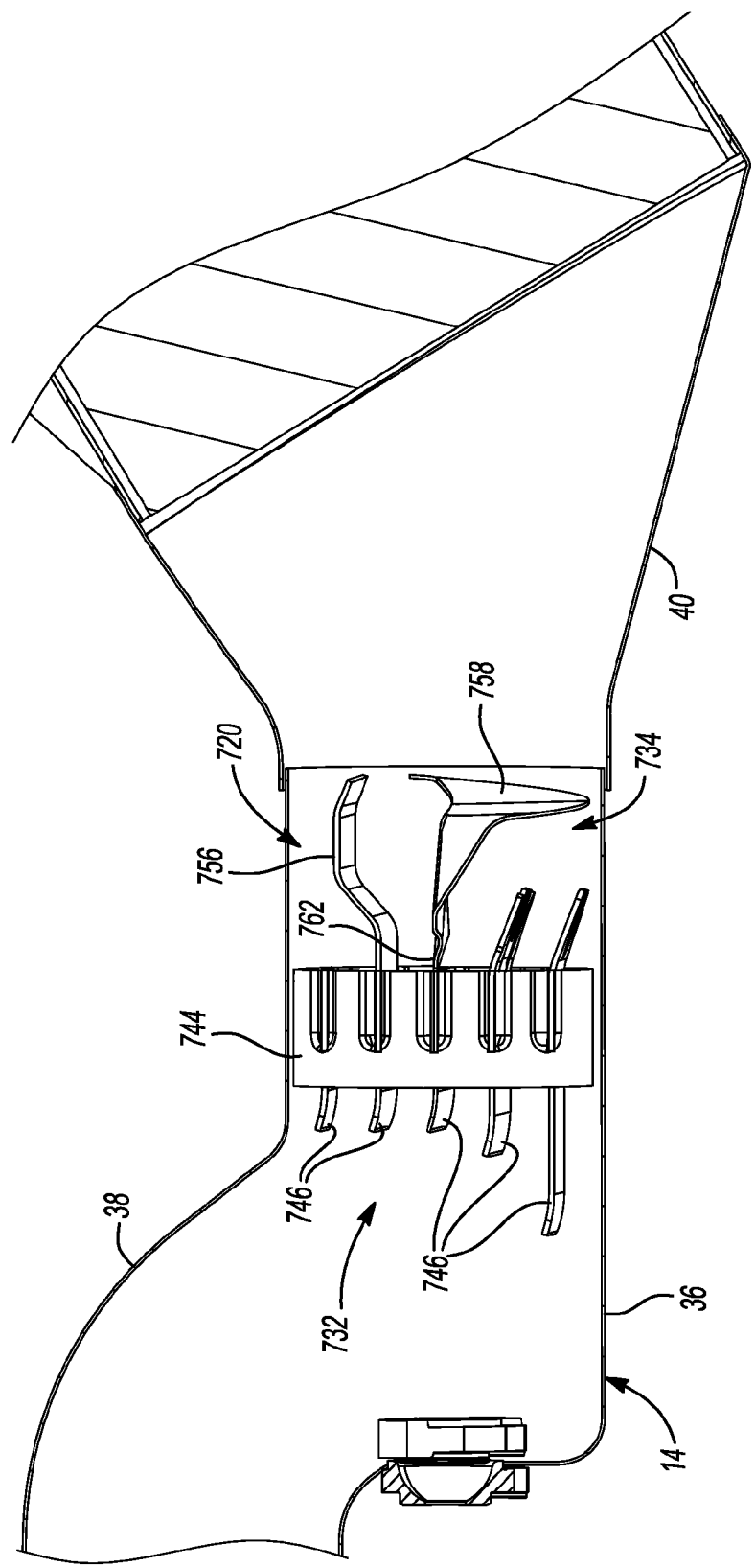
FIG. 21 is a partial cross-sectional view of the exhaust gas passageway with another mixer assembly according to the principles of the present disclosure.
Figure 22:
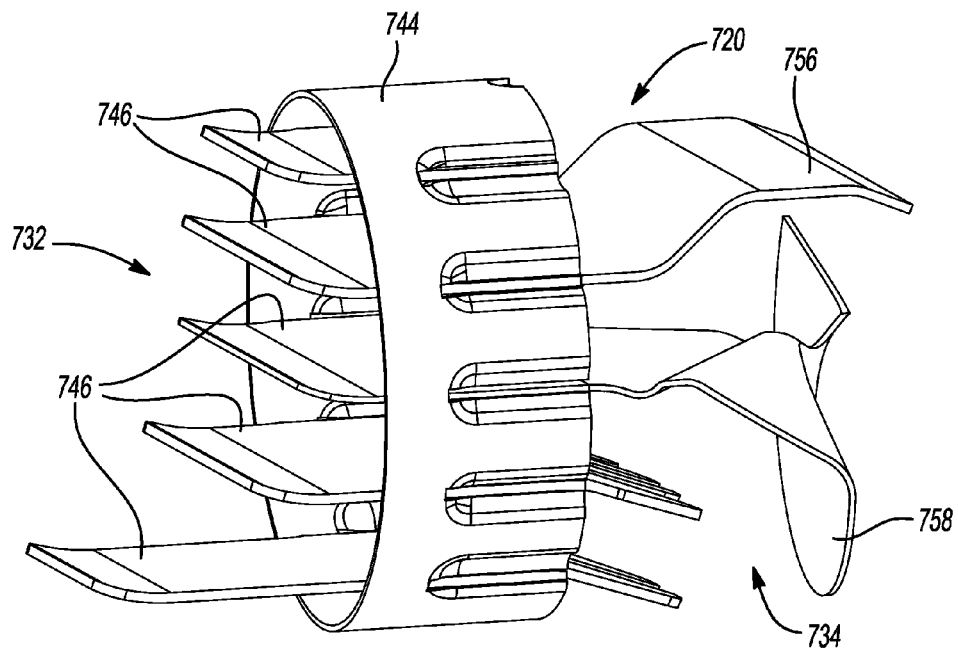
FIG. 22 is a perspective view of the mixer assembly of FIG. 21.
Figure 23:
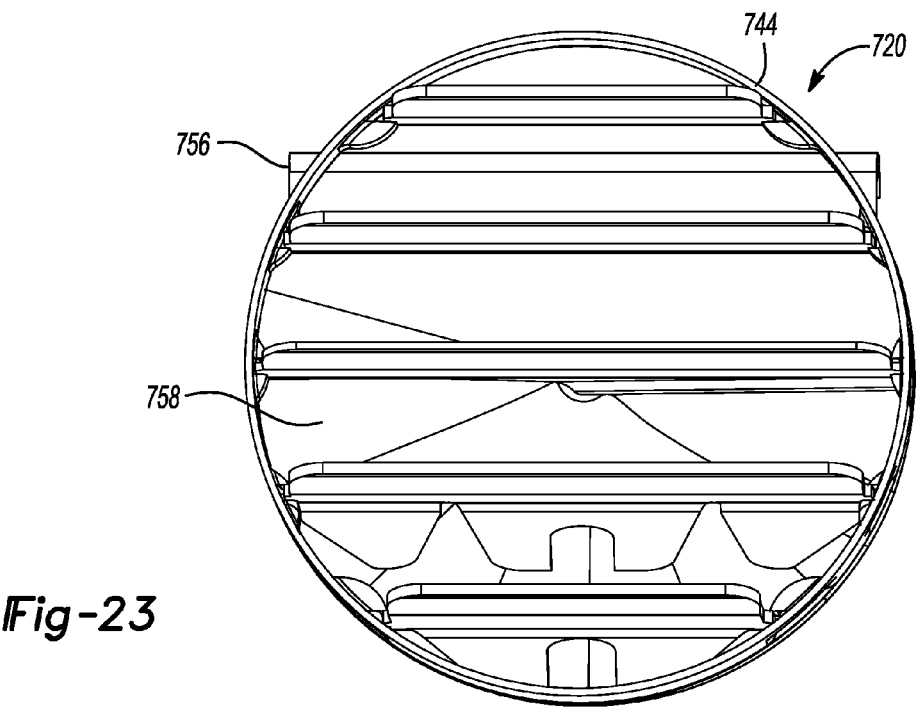
FIG. 23 is a plan view of the mixer assembly of FIG. 21.

Referring now to FIGS. 21-23, another mixer assembly 720 is provided that may be installed in the exhaust gas passageway 14 instead of the mixer assembly 20. The mixer assembly 720 may include a first stage 732 and a second stage 734. The first and second stages 732, 734 may be similar or identical to the first and second stages 232, 234 described above, apart from exceptions described below and/or shown in the figures.

Like the first stage 232, the first stage 732 may include a plurality of plates 746 attached to an annular housing 744. The plates 746 and housing 744 could be similar or identical to the plates 246 and housing 244, respectively. Like the second stage 234, the second stage 734 includes a deflector plate 756 and only a single blade 758. Unlike the deflector plate 256 and blade 258, the deflector plate 756 and blade 758 may be disposed entirely within the cylindrical portion 36 of the exhaust gas passageway 14.

Figure 24:
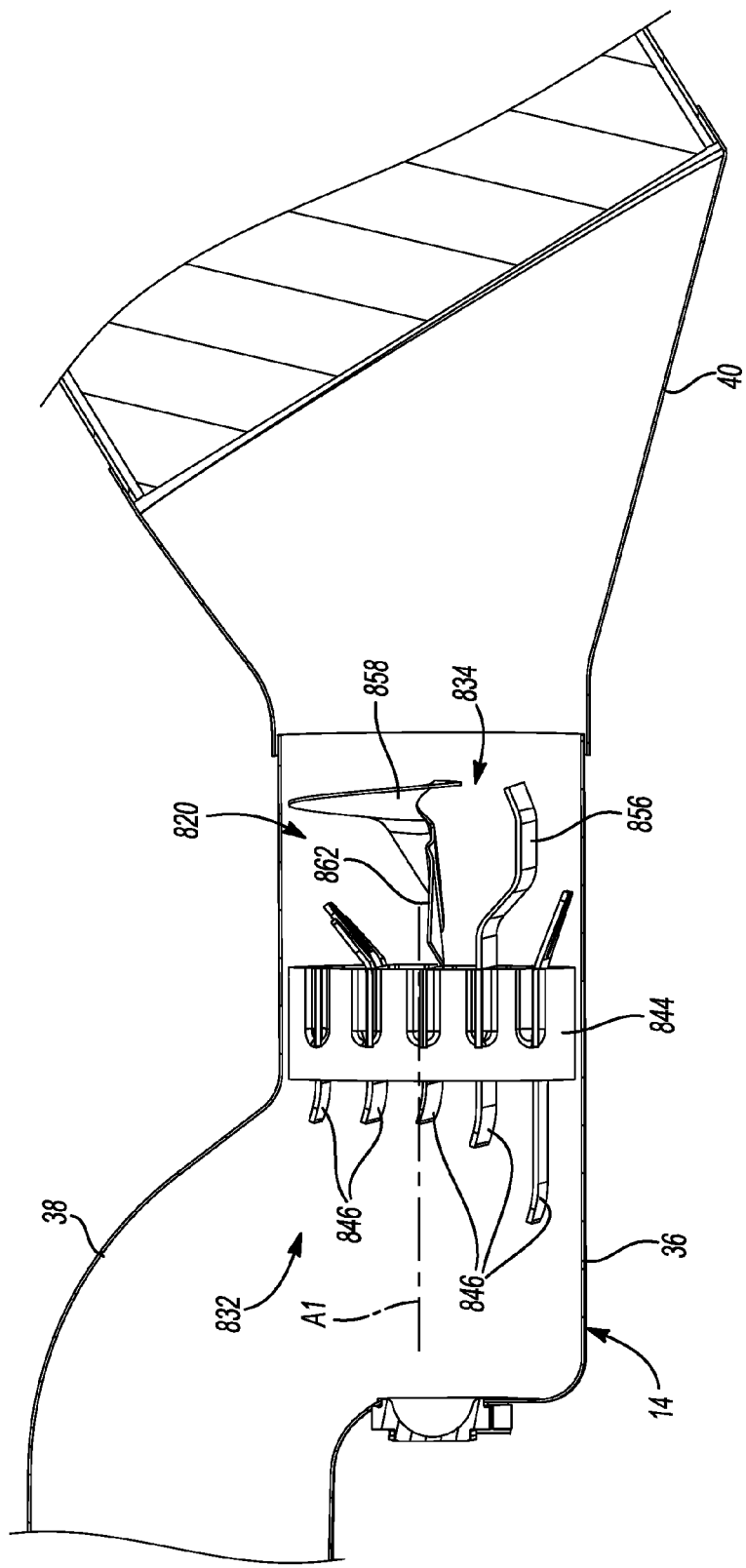
FIG. 24 is a partial cross-sectional view of the exhaust gas passageway with another mixer assembly according to the principles of the present disclosure.
Figure 25:
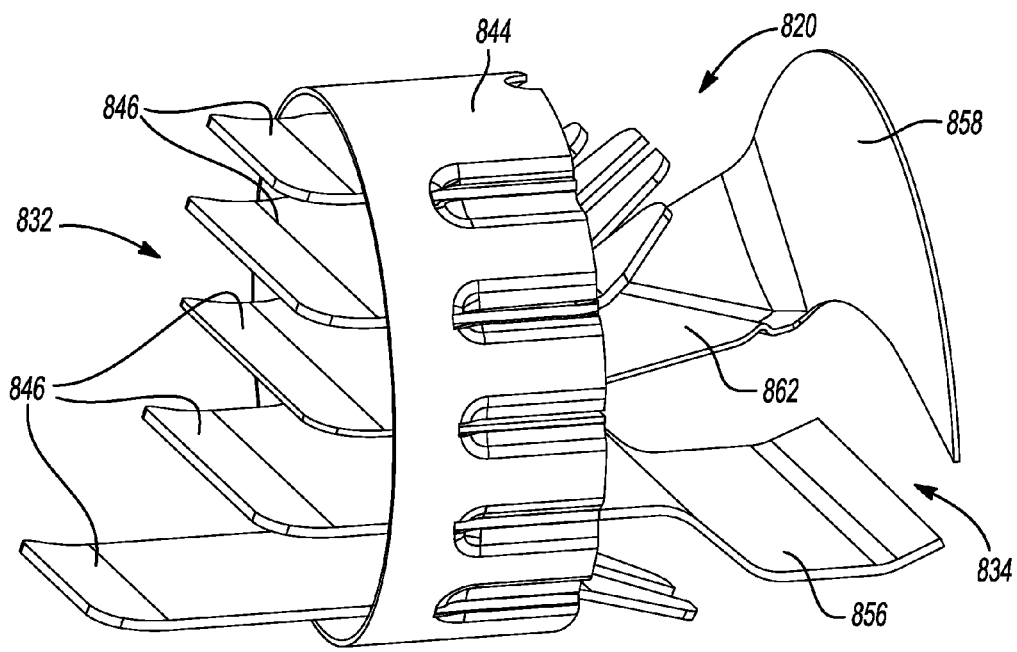
FIG. 25 is a perspective view of the mixer assembly of FIG. 24.
Figure 26:
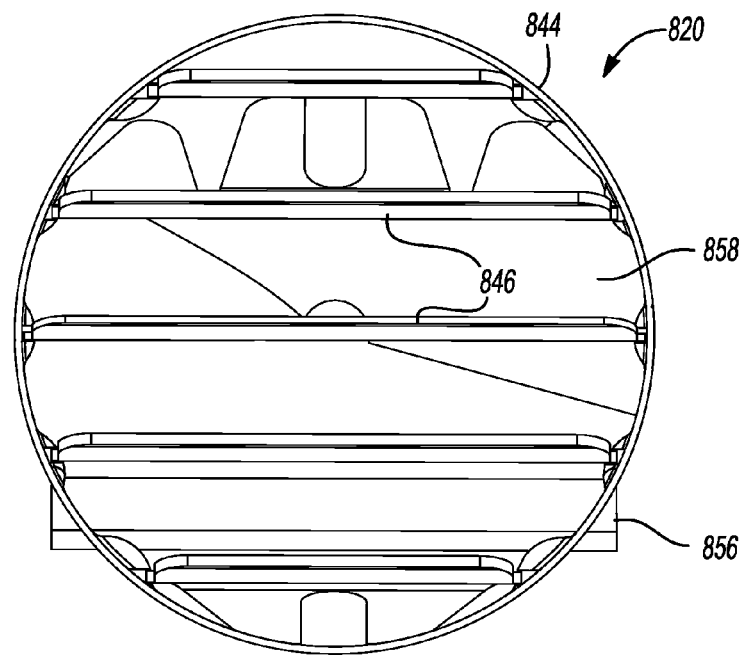
FIG. 26 is a plan view of the mixer assembly of FIG. 24.

Referring now to FIGS. 24-26, another mixer assembly 820 is provided that may be installed in the exhaust gas passageway 14 instead of the mixer assembly 20. The mixer assembly 820 may include a first stage 832 and a second stage 834. The first and second stages 832, 834 may be similar or identical to the first and second stages 732, 734 described above, apart from exceptions described below and/or shown in the figures.

Like the first stage 732, the first stage 832 may include a plurality of plates 846 attached to an annular housing 844. Like the second stage 734, the second stage 834 may include a deflector plate 856 and a single blade 858 that are disposed entirely within the cylindrical portion 36 of the exhaust gas passageway 14. A stem plate 862 of the blade 858 may extend from one of the plates 846 that extends along or proximate to the longitudinal axis A1. The blade 858 may extend radially outward from the stem plate 862 in a direction that is opposite the radial direction in which the blade 758 extends from stem plate 762. Further, the deflector plate 856 may be positioned relative to the exhaust gas passageway 14 one-hundred-eight degrees apart (about the longitudinal axis A1) from the relative positioning of the deflector plate 756 within the exhaust gas passageway 14 (compare FIGS. 21 and 24).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
an injector configured to inject a fluid into an exhaust passageway that receives exhaust gas from a combustion engine;
an aftertreatment device disposed in the exhaust passageway downstream of the injector; and
a mixer assembly disposed in the exhaust passageway upstream of the aftertreatment device and including a first stage having a plurality of parallel plates and a second stage connected to the first stage and disposed downstream of the first stage, the second stage including an auger blade extending from one of the plurality of parallel plates, the mixer assembly dividing an exhaust stream into at least two flow paths.

2. The exhaust aftertreatment system of claim 1, wherein the one of the plurality of parallel plates and the auger blade cooperate to form a monolithic body.

3. The exhaust aftertreatment system of claim 1, wherein the second stage includes another auger blade.

4. The exhaust aftertreatment system of claim 3, wherein the auger blades extend in different rotational directions.

5. The exhaust aftertreatment system of claim 4, wherein an axis of rotation of at least one of the auger blades is offset from a longitudinal axis of a pipe in which the first stage is disposed.

6. The exhaust aftertreatment system of claim 5, wherein the auger blades have different pitches.

7. The exhaust aftertreatment system of claim 1, wherein the plurality of parallel plates is at least partially disposed within an annular housing.

8. The exhaust aftertreatment system of claim 7, wherein the auger blade has a larger outer diameter than an outer diameter of the annular housing.

9. The exhaust aftertreatment system of claim 7, wherein the auger blade has an outer diameter that is equal to an outer diameter of the annular housing.

10. The exhaust aftertreatment system of claim 7, wherein first and second axial ends of the annular housing are angled at a non-perpendicular angle relative to a longitudinal axis of the annular housing.

11. The exhaust aftertreatment system of claim 1, wherein the second stage includes a deflector plate that is angled away from the auger blade.

12. The exhaust aftertreatment system of claim 11, wherein the second stage defines at least three flow paths, the deflector plate defining first and second ones of the at least three flow paths, and the auger blade defining a third one of the at least three flow paths.

13. The exhaust aftertreatment system of claim 1, wherein the second stage includes a ridge formed in a plate between the first stage and the auger blade.

14. The exhaust aftertreatment system of claim 13, wherein the ridge is formed on a stem plate that connects the auger blade with the one of the plurality of parallel plates of the first stage.

15. The exhaust aftertreatment system of claim 1, wherein the plurality of parallel plates of the first stage includes main bodies that are parallel to each other and parallel to a longitudinal axis of an annular housing in which the plurality of parallel plates is disposed, and wherein the plurality of parallel plates of the first stage includes tabs disposed at distal ends of the main bodies, the tabs are angled relative to the main bodies and the longitudinal axis of the annular housing.

16. The exhaust aftertreatment system of claim 1, wherein the first stage is disposed in a cylindrical portion of the exhaust passageway and the second stage is at least partially in a conical portion of the exhaust passageway, the conical portion having a longitudinal axis that is angled relative to a longitudinal axis of the cylindrical portion.

17. The exhaust aftertreatment system of claim 1, wherein the first and second stages are disposed in a cylindrical portion of the exhaust passageway.

18. The exhaust aftertreatment system of claim 1, wherein the aftertreatment device is a selective catalytic reduction catalyst, and wherein the fluid injected by the injector is a reductant.

19. The exhaust aftertreatment system of claim 18, further comprising an oxidation catalyst and a particulate filter, the particulate filter disposed upstream of the injector, the oxidation catalyst disposed upstream of the particulate filter.

20. The exhaust aftertreatment system of claim 1, wherein the at least two flow paths are equal divisions of a total flow through the mixer assembly.

21. The exhaust aftertreatment system of claim 1, wherein the at least two flow paths are unequal divisions of a total flow through the mixer assembly.

22. The exhaust aftertreatment system of claim 1, wherein the exhaust passageway includes a cylindrical portion in which the first stage is disposed and a curved portion directly adjacent the cylindrical portion, the curved portion disposed upstream of the cylindrical portion and intersecting the cylindrical portion at an angle relative to a longitudinal axis of the cylindrical portion.

23. The exhaust aftertreatment system of claim 22, wherein upstream ends of at least two of the plurality of parallel plates of the first stage are offset from each other in an axial direction.

24. The exhaust aftertreatment system of claim 23, wherein an upstream end of one of the plurality of parallel plates that is furthest away from an intersection of the curved portion and the cylindrical portion is further axially upstream than remaining upstream ends of the plurality of parallel plates.

25. The exhaust aftertreatment system of claim 24, wherein the plurality of parallel plates is at least partially disposed within an annular housing, and wherein first and second axial ends of the annular housing are angled at a non-perpendicular angle relative to a longitudinal axis of the exhaust passageway.

26. An exhaust aftertreatment system comprising:
an injector configured to inject a fluid into an exhaust passageway that receives exhaust gas from a combustion engine;
an aftertreatment device disposed in the exhaust passageway downstream of the injector; and
a mixer assembly disposed in the exhaust passageway upstream of the aftertreatment device and downstream of the injector, the mixer assembly including an annular housing, a plurality of parallel plates disposed in the annular housing and an auger blade disposed downstream of the annular housing, the auger blade fixedly connected to and extending from one of the plurality of parallel plates, the mixer assembly dividing an exhaust stream into at least two flow paths.

27. The exhaust aftertreatment system of claim 26, wherein the auger blade is disposed in a conical portion of the exhaust passageway.

28. The exhaust aftertreatment system of claim 26, wherein the auger blade is disposed in a cylindrical portion of the exhaust passageway.

29. The exhaust aftertreatment system of claim 26, wherein the one of the plurality of parallel plates and the auger blade cooperate to form a monolithic body.

30. The exhaust aftertreatment system of claim 26, wherein the mixer assembly includes a plurality of auger blades.

31. The exhaust aftertreatment system of claim 30, wherein two of the plurality of auger blades extend in different rotational directions.

32. The exhaust aftertreatment system of claim 31, wherein an axis of rotation of at least one of the plurality of auger blades is offset from a longitudinal axis of a cylindrical portion of the exhaust passageway.

33. The exhaust aftertreatment system of claim 32, wherein each of the plurality of auger blades has a different pitch.

34. The exhaust aftertreatment system of claim 26, wherein the auger blade has a larger outer diameter than an outer diameter of the annular housing.

35. The exhaust aftertreatment system of claim 26, wherein the auger blade has an outer diameter that is equal to an outer diameter of the annular housing.

36. The exhaust aftertreatment system of claim 26, wherein the mixer assembly includes a deflector plate extending from another one of the plurality of parallel plates, the deflector plate is angled away from the auger blade.

37. The exhaust aftertreatment system of claim 36, wherein the mixer assembly defines at least three flow paths, the deflector plate defining first and second ones of the at least three flow paths, and the auger blade defining a third one of the at least three flow paths.

38. The exhaust aftertreatment system of claim 26, wherein the mixer assembly includes a ridge formed on a stem plate that connects the auger blade with the one of the plurality of parallel plates.

39. The exhaust aftertreatment system of claim 26, wherein the plurality of parallel plates includes main bodies that are parallel to each other and parallel to a longitudinal axis of the annular housing, and wherein the plurality of parallel plates includes tabs disposed at distal ends of the main bodies, the tabs are angled relative to the main bodies and the longitudinal axis of the annular housing.

40. The exhaust aftertreatment system of claim 26, wherein the aftertreatment device is a selective catalytic reduction catalyst, and wherein the fluid injected by the injector is a reductant.

41. The exhaust aftertreatment system of claim 40, further comprising an oxidation catalyst and a particulate filter, the particulate filter disposed upstream of the injector, the oxidation catalyst disposed upstream of the particulate filter.

42. The exhaust aftertreatment system of claim 26, wherein the at least two flow paths are equal divisions of a total flow through the mixer assembly.

43. The exhaust aftertreatment system of claim 26, wherein the at least two flow paths are unequal divisions of a total flow through the mixer assembly.

44. The exhaust aftertreatment system of claim 26, wherein the exhaust gas passageway includes a curved portion, a cylindrical portion downstream of the curved portion, and a conical portion downstream of the cylindrical portion, the cylindrical portion is directly adjacent the curved portion and the conical portion, wherein at least a portion of the mixer assembly is disposed within the cylindrical portion, and wherein the conical portion has a longitudinal axis that is angled relative to a longitudinal axis of the cylindrical portion.

45. The exhaust aftertreatment system of claim 44, wherein the curved portion intersects the cylindrical portion at an angle relative to the longitudinal axis of the cylindrical portion.

46. The exhaust aftertreatment system of claim 45, wherein upstream ends of at least two of the plurality of parallel plates are offset from each other in an axial direction.

47. The exhaust aftertreatment system of claim 46, wherein an upstream end of one of the plurality of parallel plates that is furthest away from an intersection of the curved portion and the cylindrical portion is further axially upstream than remaining upstream ends of the plurality of parallel plates.

48. The exhaust aftertreatment system of claim 26, wherein first and second axial ends of the annular housing are angled at a non-perpendicular angle relative to a longitudinal axis of the exhaust passageway.

* * * * *